United States Patent
Trandafir et al.

(10) Patent No.: US 7,288,924 B2
(45) Date of Patent: Oct. 30, 2007

(54) DIGITAL INPUT CURRENT CONTROL FOR SWITCH MODE POWER SUPPLIES

(75) Inventors: Eugene Andrei Trandafir, Port Moody (CA); Jerome Ronne, Burnaby (CA); Minjie Shi, Burnaby (CA); Rasvan Catalin Mihai, Vancouver (CA)

(73) Assignee: Cellex Power Products, Inc., Richmond, B.C. (CA)

( * ) Notice: Subject to any disclaimer, the term of this patent is extended or adjusted under 35 U.S.C. 154(b) by 647 days.

(21) Appl. No.: 10/893,075

(22) Filed: Jul. 16, 2004

(65) Prior Publication Data

US 2006/0015274 A1  Jan. 19, 2006

(51) Int. Cl.
G05F 1/40 (2006.01)
G05F 5/00 (2006.01)
H02J 1/10 (2006.01)

(52) U.S. Cl. ............................ 323/283; 323/299

(58) Field of Classification Search ............ 323/222, 323/223, 225, 265, 268, 271, 282, 283, 285, 323/299, 303
See application file for complete search history.

(56) References Cited

U.S. PATENT DOCUMENTS

| | | | |
|---|---|---|---|
| 3,913,006 A * | 10/1975 | Fillmore | 323/222 |
| 4,166,690 A * | 9/1979 | Bacon et al. | 399/89 |
| 4,395,675 A | 7/1983 | Toumani | |
| 4,678,984 A | 7/1987 | Henze | |
| 5,172,329 A | 12/1992 | Rahman et al. | |
| 5,734,258 A | 3/1998 | Esser | |
| 5,757,214 A * | 5/1998 | Stoddard et al. | 327/110 |
| 5,982,157 A * | 11/1999 | Wattenhofer et al. | 323/222 |
| 6,020,729 A | 2/2000 | Stratakos et al. | |
| 6,031,361 A | 2/2000 | Burstein et al. | |
| 6,313,616 B1 * | 11/2001 | Deller et al. | 323/282 |
| 6,314,005 B1 | 11/2001 | Nishi et al. | |
| 7,095,215 B2 * | 8/2006 | Liu et al. | 323/222 |

FOREIGN PATENT DOCUMENTS

WO   WO 03/003554   1/2003

OTHER PUBLICATIONS

UC3842/3/4/5 Provides Low-Cost Current-Mode Control, Unitrode Product and Applications Handbook, 1995, Unitrode Corporation, Merrimack, NH.

(Continued)

Primary Examiner—Matthew V. Nguyen
(74) Attorney, Agent, or Firm—Oyen Wiggs Green & Mutala LLP

(57) ABSTRACT

A method and apparatus for digitally controlling the average input current of a switch mode power supply are disclosed. In preferred embodiments, the switch mode power supplies are DC-DC converters. One aspect of the invention relates to a method for controlling the switch of a switch mode power supply by digitally sampling the input current once during each power supply switching cycle at a time that is synchronized with the switching cycle. The predetermined time at which the input current is sampled may be midway through the time that the switch is in the "ON" state. This midway time may also be delayed slightly to compensate for delays associated with the switch.

47 Claims, 19 Drawing Sheets

OTHER PUBLICATIONS

Modelling, Analysis and Compensation of the Current-Mode Converter, Unitrode Product and Applications Handbook, 1995, Unitrode Corporation, Merrimack, NH.

Lloyd H. Dixon, Jr., Current-Mode Control of Switching Power Supplies, Unitrode Seminars SEM400 1985, 1985 Unitrode Corporation, Lexington, MA.

William M. Flanagan, Handbook of Transformer Design & Applications, Second Edition, Chapter 13.1 Inverter Circuits (pp. 13.1-13.9), McGraw-Hill, Inc., New York, NY.

Scott Deuty, et al., Digital Multiphase Pumps Power for CPU Cores, Planet Analog, Oct. 29, 2002, http://www.planetanalog.com/showArticle?articleID=12802238.

Lloyd Dixon, Average Current Mode Control of Switching Power Supplies, Unitrode Application Note, undated, Unitrode Corporation, Merrimack, NH.

Jingquan Chen, et al., Predictive Digital Current Programmed Control, IEEE Transactions on Power Electronics, Jan. 2003, vol. 18, No. 1.

Aleksandar Prodic, et al., Self-Tuning Digitally Controlled Low-Harmonic Rectifier Having Fast Dynamic Response, IEEE Transactions on Power Electronics, Jan. 2003, vol. 18 No. 1.

TMS320x281xDSP Event Manager (EV) Reference Guide, Texas Instruments Literature No. SPRU065C Nov. 2004.

Abraham I. Pressman, Switching Power Supply Design, Chapter 5 Current-Mode and Current-Fed Topologies (pp. 143-209), Second Edition, McGraw-Hill, 1998.

* cited by examiner

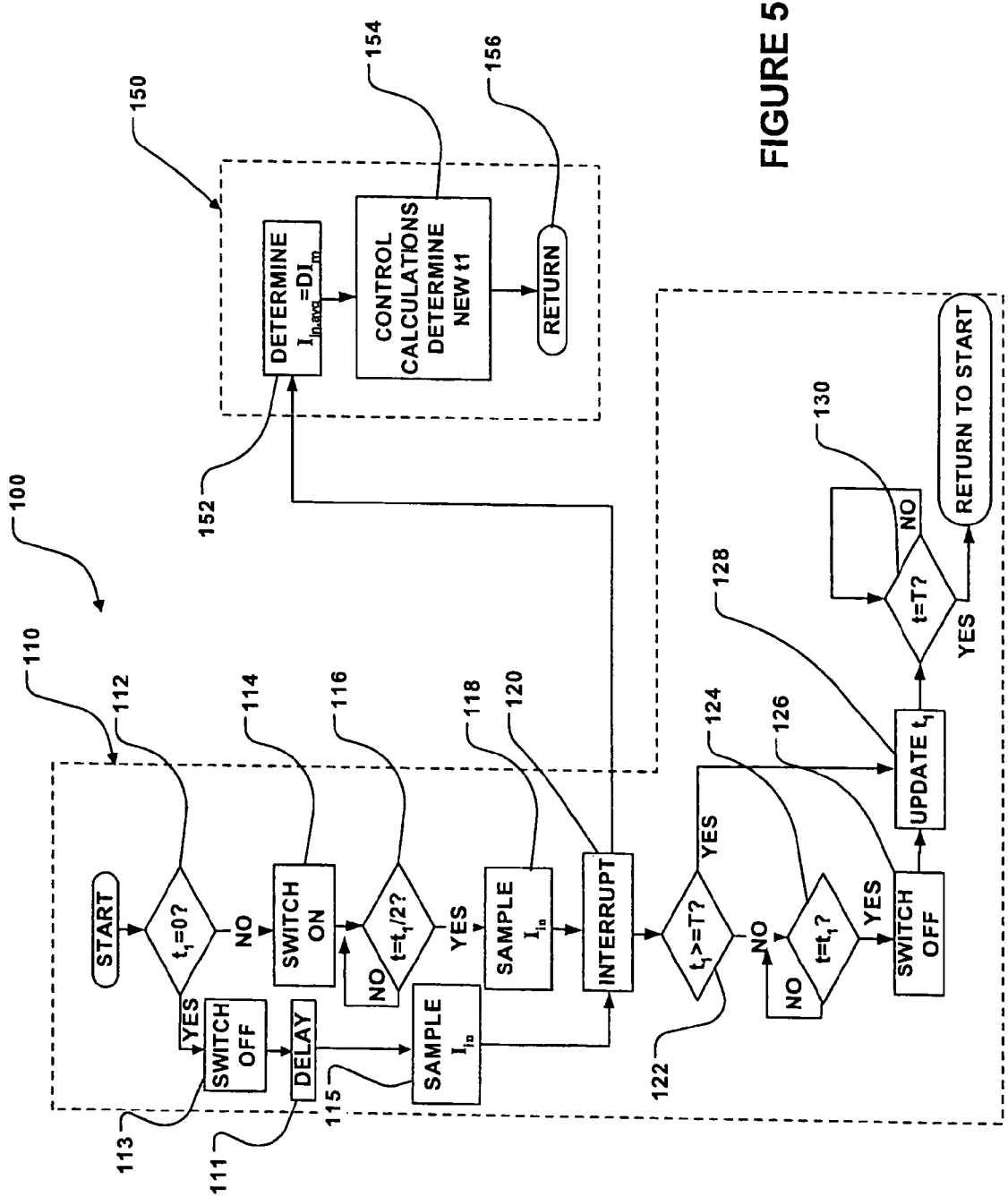

DIGITAL INPUT CURRENT CONTROL FOR SWITCH MODE POWER SUPPLIES

TECHNICAL FIELD

The invention relates to the field of switch mode power supplies. Particular embodiments of the invention have applications to digital current control for switch mode power supplies.

BACKGROUND

In general, power supply circuits are used to couple a primary power source to a load. Typically, power supply circuits modify the electrical characteristics of the primary power source to provide power having electrical characteristics that are compatible with the load. For this reason, power supplies are often referred to as power converters. In some applications, power supplies are used to provide particular voltage characteristics to the load. Switch mode power supplies represent a particular class of power supplies that use switching technology to perform power conversion. Switch mode power supplies have become recognized in the art for their relatively high efficiency.

The performance of a switch mode power supply may be improved by controlling the switching characteristics of the associated power supply circuit. Prior art techniques for controlling switch mode power supplies involve the use of an output voltage control loop. Using such techniques, the output voltage (i.e. the voltage at the load) is measured and compared to a desired output voltage to obtain control information. The control information is used to alter the power supply switching characteristics in a manner that makes the actual output voltage track a desired output voltage.

More recently, it has become possible to control switch mode power supplies by introducing an output current control loop. The output current control loop measures the output current and compares the output current to a desired output current to obtain control information. The control information is used to alter the power supply switching characteristics in a manner that makes the actual output current track a desired output current.

In some prior art power supplies, an output current control loop is combined with an output voltage control loop. The voltage control loop selects a desired output current that will achieve a desired output voltage. The output current control loop, which typically operates more quickly than the voltage control loop, obtains its desired output current from the voltage control loop. In this manner, the output current control loop selects the power supply switching characteristics that will make the actual output current track the desired output current and the actual output voltage track the desired output voltage.

Current control for switch mode power supplies has been disclosed in a number of prior art references, which include:
- U.S. Pat. No. 6,314,005 (Nishi et al.);
- U.S. Pat. No. 4,678,984 (Henze);
- U.S. Pat. No. 6,020,729 (Stratakos et al.);
- U.S. Pat. No. 6,031,361 (Burstein et al.);
- U.S. application Publication No. 2001/0038277 (Burstein et al.); and
- PCT International Application No. WO 03/003554 (Mobers).

Some prior art switch mode power supplies employ analog current control. While analog current control may be effective at high switching frequencies, analog current control has a number of disadvantages. For example, analog current controllers have limited flexibility. If the application changes, then the components of the analog control system must also change. Typically, a different analog controller is required for each different power supply circuit, whereas a digital controller embodying the same hardware could be programmed differently for different power supply circuits. With regard to testing, analog controllers must typically be assembled into their respective power supply circuits prior to testing, whereas digital controllers may be tested prior to assembly using digital techniques. The components of analog current controllers (e.g. resistors and capacitors) may also degrade over time, causing a corresponding effect on circuit performance.

There is a general need for methods and apparatus for implementing digital current control of various switch mode power supply topologies which ameliorates at least some of the disadvantages of the prior art.

SUMMARY OF THE INVENTION

One particular aspect of the invention provides a method for controlling a switch mode power supply which couples a power source to a load. The method involves operating at least one switch with a switching period T. During a given switching period, the at least one switch is operated with a first duty cycle $D=t_1/T$ by turning ON the at least one switch at a time $t=0$ and turning OFF the at least one switch at a time $t=t_1$. The method also comprises sampling a power supply input current at one or more sample times during the given switching period to obtain one or more sampled input current values. The one or more sample times are synchronized with respect to the time $t=t_1$. The method also involves: determining an estimate of a median input current $I_m$ based at least in part on the one or more sampled input current values; determining an estimate of an average input current $I_{in,avg}$ in avg by multiplying the estimate of the median input current $I_m$ and the first duty cycle D; and determining a new duty cycle D based at least in part on the estimate of the average input current $I_{in,avg}$. The at least one switch is then operated with the new duty cycle D during a subsequent switching period. Operation of the at least one switch with the new duty cycle D causes the average input current $I_{in,avg}$ to track a desired average input current $I_{in,avg,des}$.

Sampling the power supply input current at one or more sampling times during the given switching period may comprise sampling the power supply input current:
  (i) once at a time substantially close to $t=t_1/2$;
  (ii) once at a time substantially close to $t=t_1/2+\Delta$, where $\Delta$ is a delay time;
  (iii) twice at times substantially close to $t=t_1/2\pm\delta$, where $\delta$ is a time less than $t_1/2$;
  (iv) twice at times substantially close to $t=t_1/2+\Delta\pm\delta$, where $\Delta$ is a delay time and $\delta$ is a time less than $t_1/2$;
  (v) a plurality of times symmetric about $t=t_1/2$; or
  (vi) a plurality of sample times symmetric about $t=t_1/2+\Delta$, where $\Delta$ is a delay time.

Sampling the power supply input current at one or more sampling times creates one or more corresponding sampled input current values. The delay time $\Delta$ may comprise an estimate of a delay associated, at least in part, with the at least one switch.

Determining the estimate of the median input current $I_m$ may comprise:
(i) setting the estimate of the median input current $I_m$ to be equal to one corresponding sampled input current value;
(ii) averaging pairs of corresponding sampled input current values; or
(iii) averaging a plurality of corresponding sampled input current values.

The subsequent switching period may follow immediately after the given switching period or the the subsequent switching period may be temporally spaced apart from the given switching period by at least one intervening switching period.

Determining the new duty cycle D for the at least one switch may be based at least in part on the desired average input current $I_{in,avg,des}$ and on historical and current estimates of the average input current $I_{in,avg}$.

The method may comprise determining the desired average input current $I_{in,avg,des}$ using a voltage control loop by: periodically sampling a voltage at the load $V_{out}$ and, based at least in part on sampled load voltages, determining a desired average input current $I_{in,avg,des}$ that will make the voltage at the load $V_{out}$ track a desired output voltage $V_{out,des}$.

Determining the new duty cycle D for the at least one switch may comprise implementing: proportional control, proportional derivative control, proportional integral control, proportional integral derivative control or a state space control technique.

The switch mode power supply may comprise: a buck topology, a flyback topology, a bridge topology, a buck-boost topology or a push-pull topology. The switch mode power supply may also comprise other switch topologies which are known or which may become known in the art.

When the new duty cycle D is below a predetermined threshold, operating the at least one switch with the new duty cycle D during the subsequent switching period may comprise extending a duration of the switching period T for the subsequent switching period.

Another aspect of the invention provides a method for controlling an average input current $I_{in,avg}$ of a switch mode power supply to track a desired average input current $I_{in,avg,des}$. The switch mode power supply incorporates one or more switches that operate with a switching period T. For a given switching period, the method comprises turning ON the one or more switches for a first ON period $t_{ON}$ and turning OFF the one or more switches for a first OFF period $t_{OFF}$, where $t_{ON}+t_{OFF}=T$; and sampling a power supply input current at one or more sampling times during the given switching period to obtain one or more sampled input current values. The one or more sampling times are synchronized relative to a time $t=t_1$ of a transition between the first ON period $t_{ON}$ and the first OFF period $t_{OFF}$. An estimate of the average input current $I_{in,avg}$ for the given switching period is determined based at least in part on the one or more sampled input current values. Then, a new ON period is determined based at least in part on the estimate of the average input current $I_{in,avg}$. The method also comprises operating the one or more switches with the new ON period during a subsequent switching period.

Determining an estimate of the average input current $I_{in,avg}$ may comprise multiplying a first duty cycle $D=t_{ON}/T$ with a median input current value $I_m$. The median input current value $I_m$ may be based at least in part on the one or more sampled input current values. The method may involve averaging a plurality of the one or more sampled input current values to determine the median input current value $I_m$ or setting one of the one or more sampled input current values equal to the median input current value $I_m$.

Sampling the power supply input current at one or more sampling times during the given switching period may comprise sampling the power supply input current:
(i) once at a time substantially close to $t=t_{1-tON}/2$;
(ii) once at a time substantially close to $t=t_1-t_{ON}/2+\Delta$ wherein $\Delta$ comprises an estimate of a delay associated, at least in part, with the one or more switches;
(iii) twice at times substantially close to $t=t_1-t_{ON}/2\pm\delta$, where $\delta$ is a time less than $t_{ON}/2$;
(iv) twice at times substantially close to $t=t_1-t_{ON}/2\pm\delta+\Delta$, where $\delta$ is a time less than $t_{ON}/2$ and $\Delta$ comprises an estimate of a delay associated, at least in part, with the one or more switches;
(v) a plurality of times symmetric about $t=t_1-t_{ON}/2$; or
(vi) a plurality of times symmetric about $t=t_1-t_{ON}/2+\Delta$ wherein $\Delta$ comprises an estimate of a delay associated, at least in part, with the one or more switches.

Another aspect of the invention provides a method for controlling an average input current of a switch mode power supply to track a desired average input current. The switch mode power supply comprises one or more switches that operate with a constant switching period and a variable duty cycle. For each switching period, the method comprises: turning ON the one or more switches for an ON period corresponding to a current value of the variable duty cycle; sampling a power supply input current at a sample time synchronous with an end of the ON period to obtain a sampled input current value; multiplying the sampled input current value with the current value of the variable duty cycle to obtain an estimate of the average input current; determining a new value of the variable duty cycle based at least in part on the estimate of the average input current; and operating the one or more switches with the new value of the variable duty cycle during a subsequent switching period.

Another aspect of the invention provides a method for controlling an average input current of a switch mode power supply to track a desired average input current. The switch mode power supply comprises one or more first switches that operate with a first constant switching period and one or more second switches that operate with a second constant switching period. The method comprises: at a start of a given first switching period, turning ON the one or more first switches for an ON period determined by a current value of a duty cycle; and sampling a power supply input current at one or more sampling times during the ON period to obtain one or more sampled input current values. The one or more sampling times are synchronized relative to an end of the ON period. An estimate of the average input current is determined based at least in part on the one or more sampled input current values. A new value of the duty cycle is determined based at least in part on the estimate of the average input current. The method involves operating either the one or more first switches or the one or more second switches with the new value of the duty cycle during a subsequent switching period.

Yet another aspect of the present invention provides a switch mode power supply which couples a power source to a load. The power supply comprises: at least one switch operable with a switching period T; current sampling circuitry connected to sample a power supply input current at one or more sample times during the switching period T; and a processor connected to control the switch and the current sampling circuitry. The processor is connected to the at least one switch in such a manner as to operate the at least one switch with a first duty cycle $D=t_1/T$, for a given period, by turning ON the at least one switch at a time t=0 and turning OFF the switch at a time t=$t_1$. The processor is connected to the current sampling circuitry is such a manner as to obtain one or more sampled input current values at one or more corresponding sample times synchronized with respect to the time t=$t_1$. The processor is configured to: determine an estimate of a median input current $I_m$ based at least in part on the one or more sampled input current values; determine an estimate of an average input current $I_{in,avg}$ by multiplying the estimate of the median input current $I_m$ and the first duty cycle D; and determine a new duty cycle D for the at least one switch based at least in part on the estimate of the average input current $I_{in,avg}$. The processor is also connected to the at least one switch in such a manner as to operate the at least one switch with the new duty cycle D during a subsequent switching period. Operating the at least one switch with the new duty cycle D causes the average input current $I_{in,avg}$ to track a desired average input current $I_{in,avg,des}$.

Still another aspect of the invention provides a method for controlling an average input current of a switch mode power supply to track a desired average input current. The switch mode power supply comprises one or more switches that operate with a switching period and a variable duty cycle. The method comprises a step for turning ON the one or more switches for an ON period during each switching period. The duration of the ON period is determined by a current value of the variable duty cycle. The method also involves a step for sampling a power supply input current at one or more sampling times to obtain one or more sampled input current values. The one or more sampling times are synchronized relative to an end of the ON period. The method also comprises: a step for determining an estimate of the average input current based at least in part on the one or more sampled input current values; a step for determining a new value of the variable duty cycle based at least in part on the estimate of the average input current; and a step for operating the one or more switches with the new value of the variable duty cycle during a subsequent switching cycle.

Further features and applications of specific embodiments of the invention are described below.

BRIEF DESCRIPTION OF THE DRAWINGS

In drawings which depict non-limiting embodiments of the invention:

FIG. 5 is a schematic flow chart depicting a method for controlling the FIG. 4 power supply in accordance with a particular embodiment of the invention;

DETAILED DESCRIPTION

Throughout the following description, specific details are set forth in order to provide a more thorough understanding of the invention. However, the invention may be practiced without these particulars. In other instances, well known elements have not been shown or described in detail to avoid unnecessarily obscuring the invention. Accordingly, the specification and drawings are to be regarded in an illustrative, rather than a restrictive, sense.

The invention relates to the control of switch mode power supplies. In general, switch mode power supplies act as a buffer between a power source and a load. Switch mode power supplies use one or more switches to convert the electrical characteristics of power available at the power source into power having desirable electrical characteristics at the load.

Figure 1:
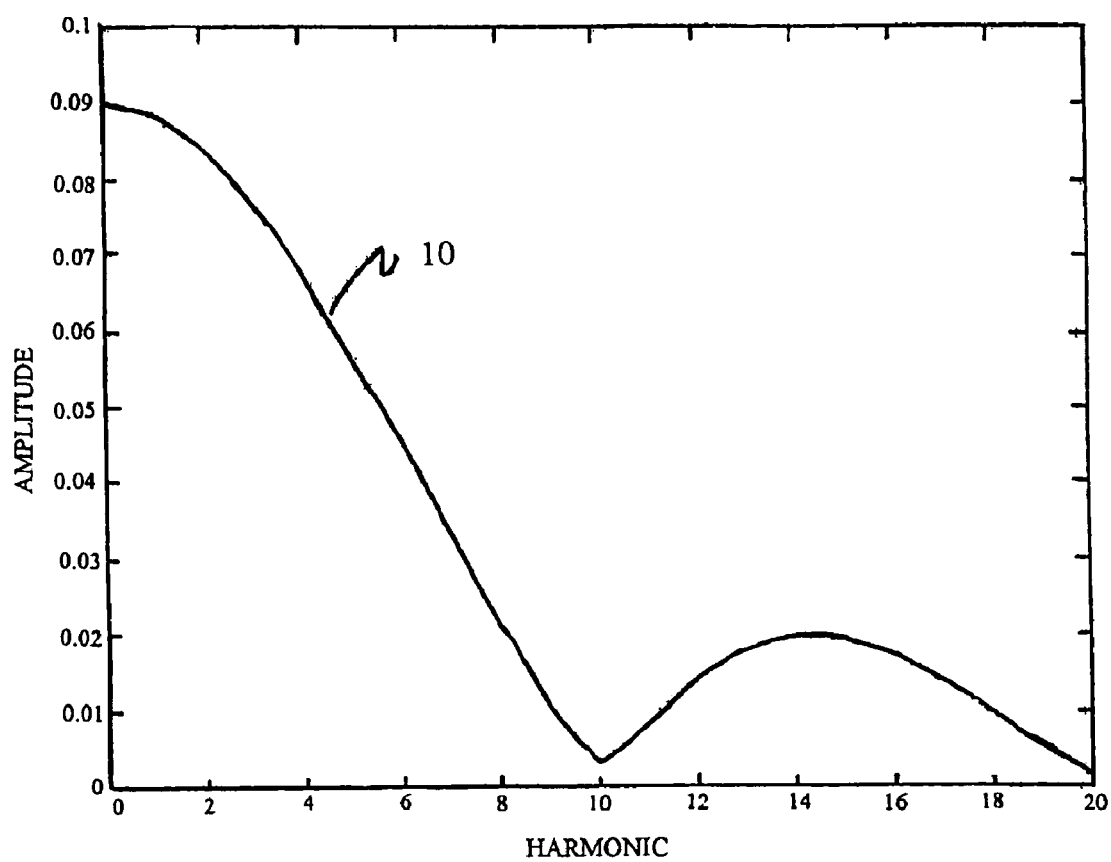
FIG. 1 is a graph depicting the frequency spectrum of a typical switch mode power supply input current waveform.

Aspects of the present invention relate to control of the input current and the switch(es) associated with switch mode power supplies. A general difficulty associated with digital input current control of switch mode power supplies relates to the high bandwidth of the input current. FIG. 1 depicts a typical frequency spectrum 10 of the input current for a switch mode power supply. In the illustrated example, frequency spectrum 10 is associated with a signal having a 10% duty signal and a 20% current ripple. The switching frequency associated with the power supply is the $0^{th}$ order harmonic. As shown in FIG. 1, spectrum 10 comprises a significant amount of power at higher order harmonics. In some applications, it may be assumed that most of the information in spectrum 10 is contained in the first ten harmonics. Even with such an estimation, the classical Nyquist sampling criteria requires that the input current signal be sampled at twice the rate of the highest frequency component (i.e. twenty times the power supply switching frequency). This sampling rate is undesirably large for digital controllers, because processor resources will be overburdened with current sampling.

Preferred embodiments of the invention have application to switch mode power supplies that are DC-DC converters. Such power supplies accept DC (or rectified AC) power input, generate a pulsed waveform from the power input using one or more switches, and filter (or otherwise manipulate) the pulsed waveform to obtain DC power output. One aspect of the invention relates to a method for controlling a switch mode power supply by digitally sampling the input current a minimal number of times per switching cycle and using the sampled input current to determine information about the average input current. Controlling the power supply involves varying the duty cycle of the power supply switch(es) based on the determined average input current. The duty cycle of the switch(es) may be selected in a manner such that the average input current of the power supply tracks a desired average input current.

Preferably, the average input current is determined by digitally sampling the actual power supply input current at a predetermined time that is synchronized with the ON time of each switching cycle and then multiplying the sampled current value with the duty cycle of a power supply switch to obtain the average input current. The predetermined time at which the input current is sampled may be midway through the time that the power supply switch is in its ON state such that the sampled input current represents an estimate of the median current. This midway time may also be delayed slightly to compensate for delays associated with the switch. In some embodiments, determining the average input current comprises sampling the input current at a plurality of times during the ON state of the switch, averaging the sampled input current values to obtain an estimate of the median input current and then multiplying the estimate of the median input current with the duty cycle of the switch to obtain the average input current. The sample times may be temporally symmetric relative to the midway time.

In one particular exemplary embodiment of the invention, a DC-DC converter is used to separate a fuel cell power source from a load. The invention may be used to control the switching characteristics and input current of the DC-DC converter, thereby allowing the fuel cell to run within acceptable parameters and protecting the fuel cell from potential damage caused by sudden load changes. The invention may generally be used for any DC power source, but offers substantial benefit where the DC power source has relatively high output impedance or otherwise has a slow response to sudden current changes.

Figure 4:
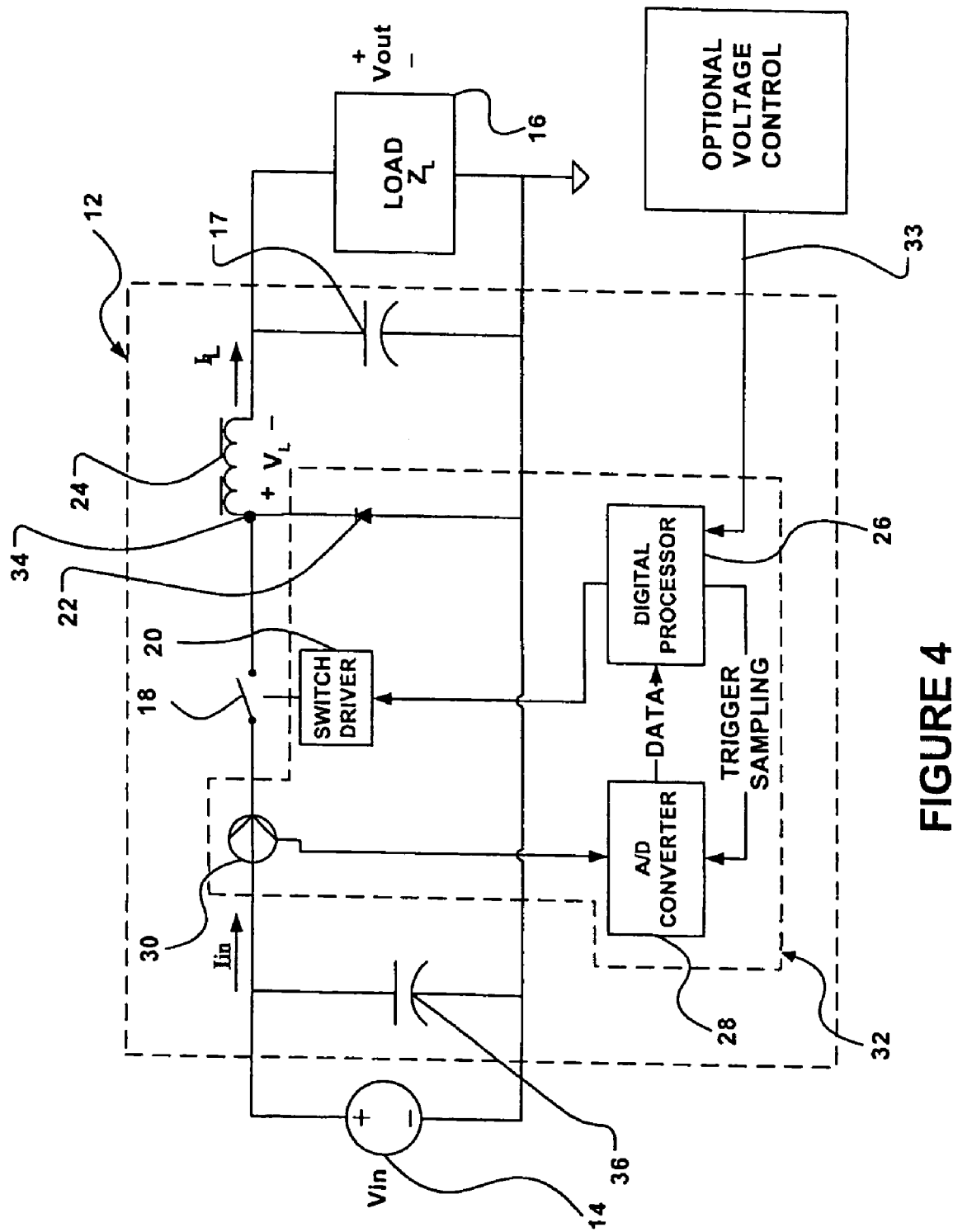
FIG. 4 is a schematic circuit diagram of a switch mode power supply having a buck topology and an associated control system in accordance with a particular embodiment of the invention.

FIG. 4 is a schematic block diagram of a switch mode power supply 12 and its current control system 32 according to a particular embodiment of the invention. In the FIG. 4 embodiment, power supply 12 couples a DC power source 14 to a load 16. Power supply 12 has a configuration referred to in the art as a "buck topology". In general, DC power source 14 may comprise any DC (or rectified AC) power source. Particular examples of DC power sources 14 include fuel cells, generators, batteries and the like.

Power supply 12 comprises a switch 18, a freewheeling diode 22 and an inductor 24. As is well known in the art, switch 18 may be implemented using any of a variety of different types of switching means. For example, switch 18 may comprise any type of power semiconductor switch, such as a bipolar junction transistor (BJT), an insulated gate bipolar transistor (IGBT) or the like. In one particular embodiment, switch 18 comprises a MOSFET transistor. Switch 18 may also comprise any type of electromechanical switch. Preferably, switch 18 has a fast switching time and is able to withstand voltage spikes, which may be caused by inductor 24 and/or other parasitic impedances in the circuit. Power supply 12 may comprise an optional input filter, which is represented in FIG. 4 by a capacitor 36. In cases where power source 14 has a high output impedance, input filter 36 helps to prevent sudden changes in voltage and current at the input of power supply 12. Load 16 may be buffered by a suitable battery (not shown) or, as shown in the illustrated embodiment, a suitable capacitive filter 17.

Current control system 32 controls the operation of power supply 12. Current control system 32 comprises a digital processor 26, an analog to digital (A/D) converter 28 and a current sensor 30. In the FIG. 4 embodiment, current control system 32 also comprises a switch driver 20. Preferably, current sensor 30 is connected in series with switch 18 between power source 14 and freewheeling diode 22. In alternative embodiments, current sensor 30 is connected in the negative power path between the negative terminal of power source 14 and the anode of freewheeling diode 22. Current sensor 30 may generally comprise any current sensor known in the art. For example, current sensor 30 may comprise a simple resistor or a more complex current sensing circuit, such as a Hall effect sensor. Current sensor 30 is preferably sufficiently robust to accommodate the relatively rapidly changing currents associated with the changing conductive states of switch 18.

Depending, in part, on the switching frequency of power supply 12, processor 26 may comprise a microcontroller, a digital signal processor (DSP), a field programmable gate array (FPGA) or the like. Processor 26 may also comprise any combination of such processors. Processor 26 may be connected to a memory (not shown), which may store operating instructions, operational parameters or the like. In some embodiments, processor 26 comprises its own A/D converter. In such embodiments, a separate A/D converter 28 is not required. Current control system 32 may also comprise a switch driver 20 for providing input to switch 18. Switch driver 20 is controlled by processor 26. Switch driver 20 may be used in circumstances where the digital outputs of processor 26 are unable to provide specific voltages, currents or power levels required to quickly and reliably turn switch 18 ON (closed) and OFF (open) and/or in circumstances where electrical isolation of processor 26 is required. Current control system 32 may also comprise some signal conditioning circuitry (not shown) which may be connected in series between current sensor 30 and A/D converter 28. The signal conditioning circuitry may comprise scaling amplifier(s) and filter(s), for example.

Current control system 32 operates switch 18 by switching it ON and OFF in a switching cycle having a constant period T and a controllably varying duty cycle D. The duty cycle D is defined as the fraction of the period T where switch 18 is ON. For a given period T, switch 18 is ON for $0<t<t_1 (t_{ON})$ and switch 18 is OFF for $t_1<t<T$ ($t_{OFF}$). For a given switching period the time t=0 represents the time at which switch 18 transitions from its OFF state to its ON state and the time t=t$_1$ represents the time at which switch 18 transitions from its ON state to its OFF state. Accordingly, for a given switching period T that begins with a transition of switch 18 from its OFF state to its ON state at t=0, the duty cycle D can be mathematically defined as D=t$_{ON}$/T=t$_1$/T.

In operation, inductor 24 functions to reduce the ripple in the current caused by the switching of switch 18. At the commencement of a given switching period at t=0, switch 18 is turned ON for a time 0<t<t$_1$(t$_{ON}$). During this time (t$_{ON}$) when switch 18 is in its ON state, current flows from power source 14, through the current path comprising switch 18, inductor 24 and load 16. Consequently, the inductor current I$_L$ and the input current I$_{in}$ rise and charge is built up in inductor 24. At t=t$_1$, switch 18 is turned OFF for the balance of the switching period (i.e. for t$_1$<t<T (t$_{OFF}$)). At t=t$_1$, the input current I$_{in}$ is reduced to zero and the polarity of inductor 24 is reversed, such that diode 22 is forward biased and the flow of the inductor current I$_L$ is maintained through the current path comprising diode 22, inductor 24 and load 16. For t$_1$<t<T (t$_{OFF}$), the inductor current I$_L$ decreases until inductor 24 is completely discharged (discontinuous conduction mode) or switch 18 is turned ON again at t=T in a subsequent switching cycle (continuous conduction mode). It will be appreciated that where the duty cycle D is larger, the average input current I$_{in}$ will be relatively large and where the duty cycle D is smaller, the average input current I$_{in}$ will be relatively small.

Figure 2:
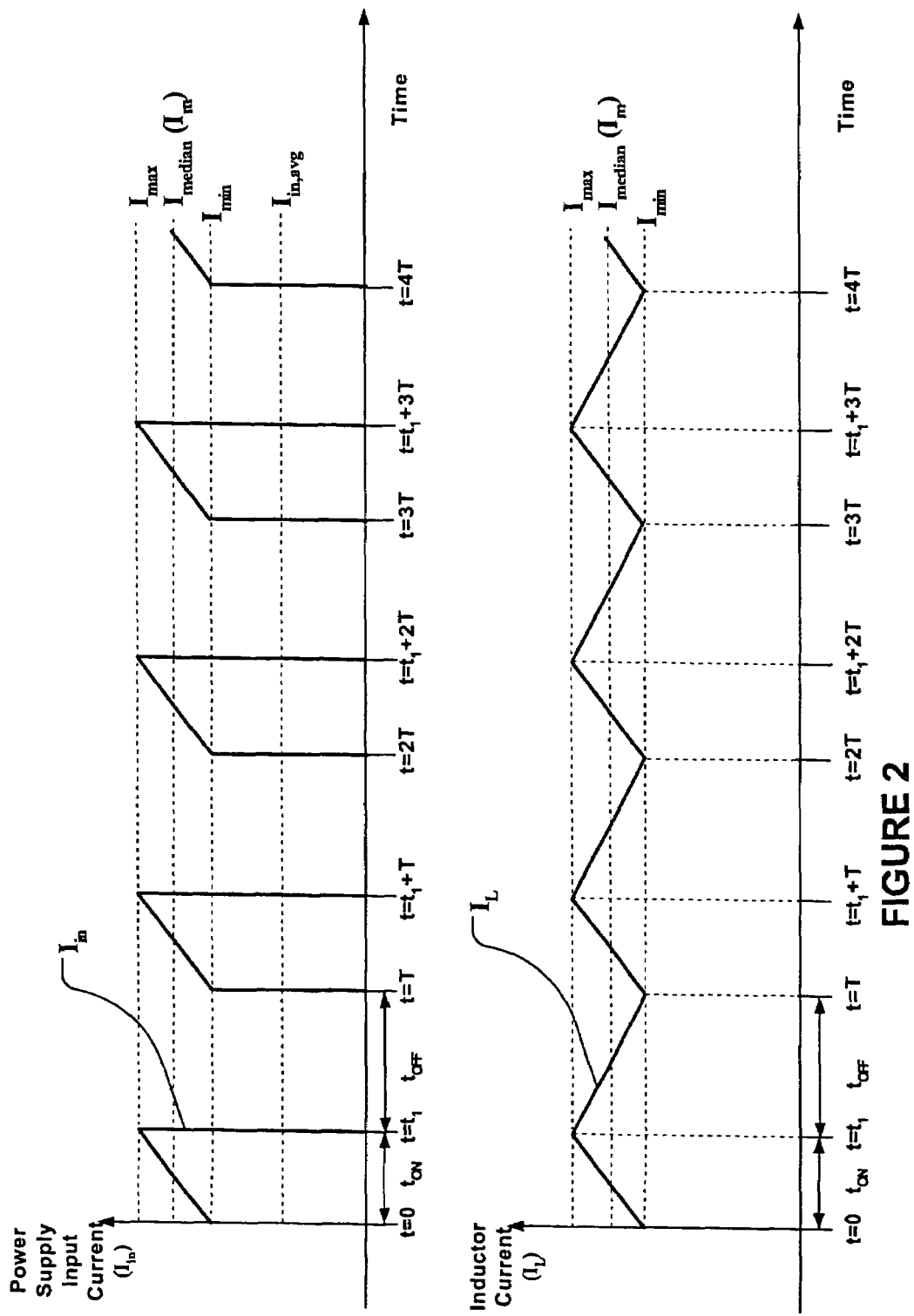
FIG. 2 shows a typical steady state inductor current waveform and a corresponding input current waveform for a switch mode power supply in continuous conduction mode.
Figure 3:
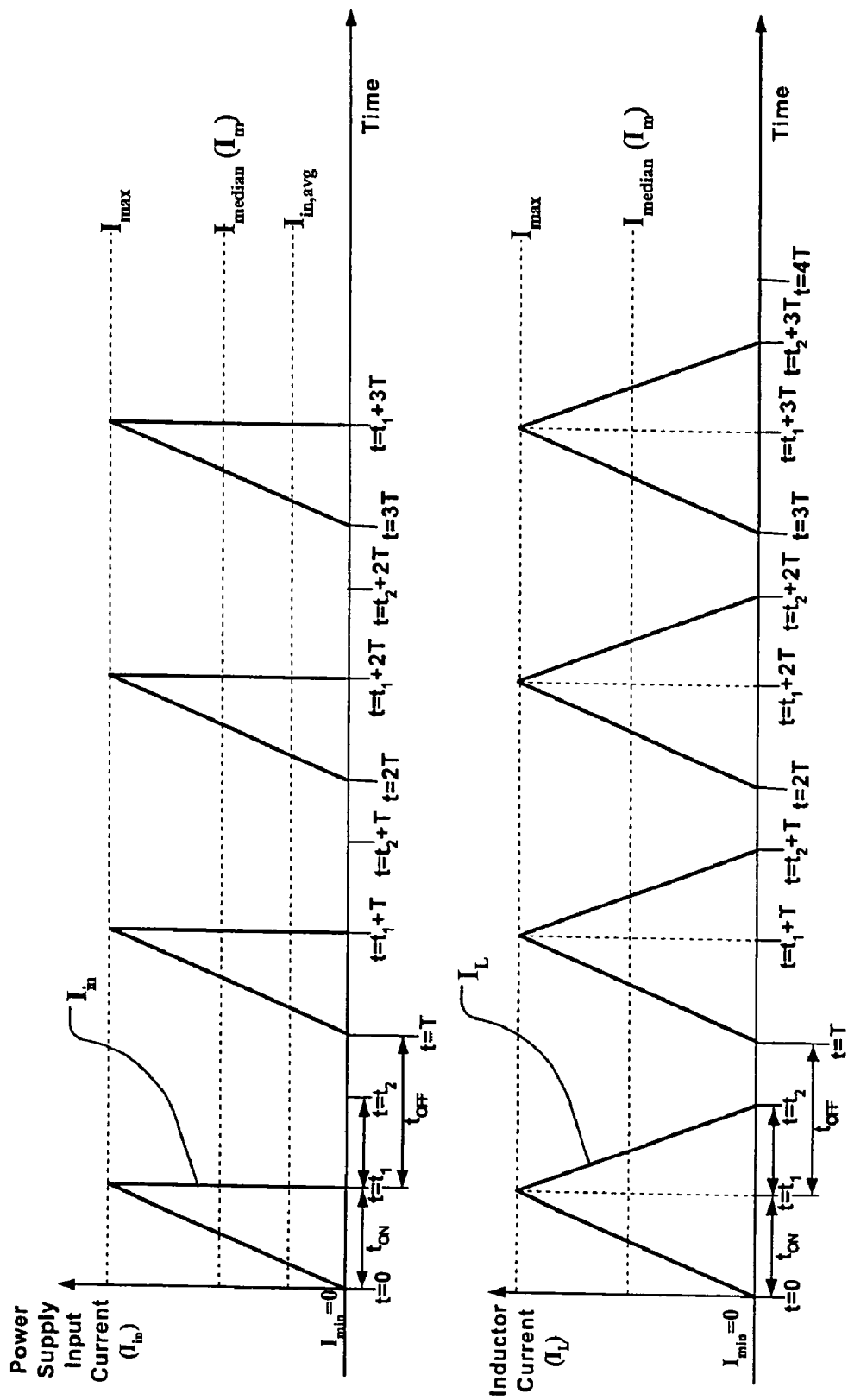
FIG. 3 shows a typical steady state inductor current waveform and a corresponding input current waveform for a switch mode power supply in a discontinuous conduction mode.

As is well known in the art, switch mode power supplies configured in the buck topology can operate in continuous and discontinuous conduction modes. FIG. 2 depicts a number of waveforms associated with the ideal steady state inductor current I$_L$ and the ideal input current I$_{in}$, when power supply 12 is operating in a continuous conduction mode. FIG. 3 depicts the waveforms associated with the ideal steady state inductor current I$_L$ and the ideal input current I$_{in}$ when power supply 12 is operating in a discontinuous conduction mode. For the purpose of explaining the basic operation of power supply 12 as illustrated in FIGS. 2 and 3, it is assumed that power supply 12 operates with a constant switching period T and a constant duty cycle D=t$_1$/T. Power supply 12 operates in a continuous conduction mode (FIG. 2) when the duty cycle D and the parameters of the components of power supply 12 and load 16 are such that inductor 24 is always conducting current (i.e. I$_L$>0 for all t). Conversely, power supply 12 operates in a discontinuous conduction mode (FIG. 3) when the duty cycle D and the parameters of the components of power supply 12 and load 16 are such that inductor 16 is completely de-energized for a portion of the switching cycle (i.e. I$_L$=0 for t$_2$<+<T).

In the example waveforms of FIGS. 2 and 3, the switching period T, the components of power supply 12, load 16 and power source 14 are selected such that the response times associated with power supply 12 are large compared to the switching period T. In such circumstances, the input voltage V$_{in}$ at power source 14 and the output voltage V$_{out}$ at load 16 (see FIG. 4) will be approximately constant over a switching cycle and the rise and fall of the inductor current I$_L$ will be approximately linear over a switching cycle.

In the continuous conduction mode illustrated in FIG. 2, it can be seen that when switch 18 is turned ON at t=0, I$_L$=I$_{min}$, the inductor current increases linearly until t=t$_1$ (i.e. throughout the ON period (t$_{ON}$) of switch 18). At t=t$_1$, switch 18 transitions from its ON state to its OFF state. For the period of time t$_1$<t<T (i.e. the OFF period (t$_{OFF}$) of switch 18), inductor 24 continues to draw current (through freewheeling diode 22), but the current decreases linearly until t=T, at which point switch 18 is turned ON again and the cycle repeats itself.

In the discontinuous conduction mode of FIG. 3, switch 18 is turned ON at t=0. At t=0, the inductor current I$_L$=I$_{min}$=0. The inductor current I$_L$ increases linearly throughout the ON period (t$_{ON}$) of switch 18, until t=t$_1$, at which point switch 18 transitions from its ON state to its OFF state. For the period of time t$_1$<t<t$_2$, inductor 24 continues to draw current (through freewheeling diode 22), but the current decreases linearly until t=t$_2$. At t=t$_2$, inductor 24 is completely de-energized and the inductor current I$_L$=0 for the period of time where t$_2$<t<T. When t=T, switch 18 is turned ON again and the cycle repeats itself.

It is useful, for the purposes of describing the discontinuous operation, to define a duty cycle D$_d$ for freewheeling diode 22. Thus, D=t$_1$/T is the duty cycle of switch 18 (i.e. where switch 18 is supplying current to inductor 24) and D$_d$=(t$_2$-t$_1$)/T is the duty cycle of freewheeling diode 22 (i.e. where diode 22 is supplying current to inductor 24). The time that switch 18 is supplying current is t$_1$=DT and the time that freewheeling diode 22 is supplying current is t$_2$-t$_1$=D$_d$T. The boundary between continuous and discontinuous conduction occurs at D+D$_d$=1, where D+D$_d$>1 represents the condition for continuous conduction and D+D$_d$<1 represents the condition for discontinuous conduction.

As discussed above, power supply circuit 12 may be designed such that inductor 24 operates in its linear region as shown in FIGS. 2 and 3. In general, the voltage across inductor 24 is given by V$_L$=L(dI$_L$/dt), where L is the inductance of inductor 24. In the linear operational region, the inductor voltage V$_L$ is constant, and this expression may easily be solved for I$_L$. Accordingly:

$$I_L(t) = I_{\min} + \frac{V_L}{L}t \tag{1}$$

for 0<t<t$_1$ (t$_{ON}$), where I$_{min}$ is the inductor current at t=0 when switch 18 is just turned ON. For discontinuous conduction (FIG. 3), I$_{min}$=0, but for continuous conduction (FIG. 2), I$_{min}$≠0. Observing FIGS. 2 and 3 and computing the average inductor current I$_{L,\,avg}$ over a period according to:

$$I_{L,avg} = \frac{1}{T}\int_0^T I_L(t)dt \tag{1a}$$

It can be seen that the average inductor current I$_{L,\,avg}$ is given by:

$$I_{L,avg} = \frac{I_{\min} + I_{\max}}{2} \tag{2}$$

for continuous conduction (FIG. 2); and $$I_{L,avg} = \frac{I_{max} t_2}{2T} \quad (3)$$

for discontinuous conduction (FIG. 3).

FIGS. 2 and 3 also show the input current $I_{in}$ which flows into power supply 12 through current sensor 30 (FIG. 4). The waveforms of FIGS. 2 and 3 show that for both continuous conduction and discontinuous conduction, the average input current $I_{in,\ avg}$ is given by:

$$I_{in,avg} = D \frac{I_{min} + I_{max}}{2} \quad (4)$$

where $D = t_1/T$ and $I_{min} = 0$ for the discontinuous conduction case (FIG. 3). It is convenient to define a median input current, $I_m$, where:

$$I_m = \frac{I_{min} + I_{max}}{2} \quad (5)$$

Thus:

$$I_{in,avg} = D I_m \quad (6)$$

From FIGS. 2, 3 and 4 it can be seen that the input current $I_{in}$ is equal to the inductor current $I_L$ for $0 < t \leq t_1$. Using equation (1) to evaluate $I_{in}$ at $t = t_1$, yields:

$$I_{in}(t = t_1) = I_{max} = I_{min} + \frac{V_L}{L} t_1 \quad (7)$$

Combining equations (1), (5) and (7), yields the following relationship:

$$I_{ik}\left(t = \frac{t_1}{2}\right) = I_m = I_{min} + \frac{V_L t_1}{2L} \quad (8)$$

Equation (8) shows that a measurement of the input current $I_{in}$ at $t = t_1/2$ yields the median input current $I_m$. If the median input current $I_m$ is known, then the average input current $I_{in,\ avg}$ may be obtained by one simple multiplication operation of the median input current $I_m$ with the duty cycle D according to equation (6). Thus by selectively sampling the input current $I_{in}$ once per switching cycle at $t = t_1/2$, a measured value of the average input current $I_{in,\ avg}$ may be obtained. Using conventional control techniques, the average input current $I_{in,\ avg}$ may be controlled to track a desired average input current $I_{in,\ avg,\ des}$.

Referring to FIG. 4, current control system 32 controls the average input current $I_{in,\ avg}$ to track a desired average input current $I_{in,\ avg,\ des}$. Current sensor 30 measures the input current $I_{in}$ and current sensor 30 (alone or in combination with signal conditioning circuitry (not shown)) converts the current signal to a voltage signal, which may be read by A/D converter 28. Once per switching cycle (at $t = t_1/2$), processor 26 samples the input current $I_{in}$ by triggering A/D converter 28 to obtain a digital value representative of the input current $I_{in}$. A/D converter 28 provides this digital input current measurement to processor 26. Because of the timing of the measurement (at $t = t_1/2$), the digital input current measurement is representative of the median current $I_m$ (see equation (8)). Processor 26 then determines a measured value of the average input current $I_{in,\ avg}$ using a single multiplication operation between the sampled input current value and the current duty cycle D according to equation (6).

Processor 26 is provided with a desired average input current $I_{in,\ avg,\ des}$ which may be dependent, for example, on the electrical characteristics required at load 16. Processor 26 controls the average input current $I_{in,\ avg}$ to track the desired average input current $I_{in,\ avg,\ des}$. To accomplish this, processor 26 may use the desired average input current $I_{in,\ avg,\ des}$ together with the current and historical measured values of the average input current $I_{in,\ avg}$ to determine a new duty cycle D (or equivalently a new $t_1$) to be applied to switch 18 during a subsequent switching cycle. It will be appreciated that an increase in the duty cycle D will result in an increase in the average input current $I_{in,\ avg}$ and that a decrease in the duty cycle D causes a decrease in the average input current $I_{in,\ avg}$. Controller 26 may use any well known control technique, to determine the new duty cycle D. Such control techniques may include, without limitation: proportional (P), proportional derivative (PD), proportional integral (PI), proportional integral derivative (PID) and state space control techniques, such as model-predictive control for example.

Processor 26 may comprise (or may otherwise be connected to control) pulse width modulation (PWM) outputs (not shown), which may be used to effect changes of the duty cycle D. Preferably, A/D converter 28 and processor 26 are sufficiently fast to compute a new duty cycle D for each successive switching cycle of power supply 12. For example, if the input current $I_{in}$ is sampled at $t = t_1/2$ during a first switching cycle, then controller 26 is preferably capable of determining a new duty cycle D, which it applies to switch 18 for the immediately succeeding switching cycle of power supply 12. In some embodiments, switching frequencies are as high as 1 MHz or higher. In preferred embodiments of the invention, switching frequencies are up to 500 kHz. Those skilled in the art will appreciate that at these switching frequencies, there are a wide variety of A/D converters and processors that operate with speeds capable of determining a new duty cycle D for each successive switching cycle.

In some circumstances, the switching period T of power supply 12 is on the order of or less than the time required to determine a new duty cycle D (i.e. the calculation period). In such circumstances, the timing for sampling the input current $I_{in}$ during a given switching period may remain the same (i.e. at $t = t_1/2$). However, because the calculation period is on the order of or greater than the given switching period, the new duty cycle D may be applied to switch 18 in a subsequent switching period that follows one or more intervening switching periods. That is, the duty cycle D may remain constant throughout the given switching period and one or more intervening switching periods, before current control system 32 applies the new duty cycle D to switch 18 in a subsequent switching period.

FIG. 5 is a schematic flow chart depicting a method 100 for controlling power supply 12 in accordance with a particular embodiment of the invention. Method 100 may be controlled by processor 26 (FIG. 4). Method 100 comprises a main switching loop 110 and a software control loop 150, which may execute generally concurrently with one another. In practice, the particular events of switching loop 110 and control loop 150 may be governed by various interrupts and/or subroutines executed in processor 26. Method 100 commences in switching loop 110 at block 112, where a test is conducted to determine if the current value of $t_1=0$. In most cases where power supply 12 is active, $t_1 \neq 0$ and switch 18 is turned ON in block 114, such that current flows through switch 18 to inductor 24 (FIG. 4).

Processor 26 waits (at block 116) for the sampling time, $t=t_1/2$. In practical applications, processor 26 need not be idle during block 116 and may be available to perform other tasks. When the sampling time, $t=t_1/2$, is reached, control loop 110 advances to block 118, where A/D converter 28 is triggered to obtain a digital sample of the input current $I_{in}$. In some embodiments, A/D converter 28 is triggered by processor 26 in response to a sampling interrupt (not shown) generated in processor 26. In other embodiments, A/D converter 28 is configured such that it will automatically sample at the desired time in each switching cycle (i.e. at $t=t_1/2$) and A/D converter 28 may generate an interrupt in processor 26 when a sampled input current value $I_{in}$ is available. In any case, when the digital sample of the input current $I_{in}$ is available to processor 26, an interrupt is generated (block 120), which causes processor 26 to enter control loop 150.

As shown by equation (8), the input current $I_{in}$ at $t=t_1/2$ is equal to the median current $I_m$. In block 152 of control loop 150, processor 26 multiplies the digital sample of the input current $I_{in}$ (i.e. the median current $I_m$) with the current value of the duty cycle D to determine a measured value for the average input current $I_{in, avg}$ (see equation (6)). In block 154, processor 26 performs control calculations to determine a new duty cycle D (i.e. a new value for $t_1$), if required. A new duty cycle D may not be required if the measured value of the average input current $I_{in, avg}$ and the desired value of the average input current $I_{in, avg, des}$ are equal. If, on the other hand, processor 26 determines that the measured value for the average input current $I_{in, avg}$ is not equal to the desired value for the average input current $I_{in, avg, des}$, then processor 26 performs control calculations to determine a new duty cycle D to be applied to switch 18 during a subsequent switching period. After calculating the new duty cycle D, control loop 150 concludes at block 156.

Back in block 122 of main switching loop 110, processor 26 performs a test to determine if $t_1 \geq T$. In most cases, $t_1 < T$ and so processor 26 proceeds to block 124, where it waits until $t=t_1$. As discussed above, processor 26 need not be idle during this time and may be available to perform other tasks, such as the tasks in control loop 150, for example. Once the time ($t=t_1$) is reached, processor 26 turns switch 18 OFF in block 126. Switching loop 110 then advances to block 128, where the duty cycle value D is updated with the new duty cycle value D that was determined in block 154 of control loop 150. Processor 26 may store the new duty cycle D or, equivalently, a new value for $t_1$, in memory or in a hardware register, for example. In block 130, processor 26 waits for the end of the current switching cycle (i.e. until $t=T$). Once again, while waiting in block 156, processor 26 may be available to perform other tasks. When $t=T$, processor 26 starts a new cycle by returning to block 112. Before commencing each new switching period, processor 26 may reset its time counter to $t=0$.

FIG. 5 also depicts a method of controlling power supply 12 for a pair of unique cases, where $t_1=0$ and where $t_1 \geq T$. Where $t_1=0$ for a particular switching cycle, it is not necessary to turn switch 18 to the ON state. Accordingly, in block 112, a test is performed to determine whether $t_1=0$. As discussed above, in most cases where power supply 12 is active, $t_1 \neq 0$ and processor 26 advances to block 114 where switch 18 is turned ON. If, on the other hand, $t_1=0$, then block 114 is bypassed so that switch 18 remains OFF. In the FIG. 5 embodiment, if the block 112 test indicates that $t_1=0$, then processor 26 ensures that switch 18 remains OFF (or is turned OFF) in block 113, delays for suitable period of time in block 111 and then samples the input current $I_{in}$ in block 115. The block 111 delay ensures that switch 18 is completely OFF before sampling the input current $I_{in}$ in block 115. The length of the block 111 delay typically depends on the characteristics of switch 18. The length of the block 111 delay may also depend on delays associated with switch driver 20 and an estimate of switch parasitics. In alternative embodiments, when the block 112 test indicates that $t_1 = 0$, an assumption is made that the sample input current value $I_{in}$ is zero. After obtaining a value for the sample input current value $I_{in}$, processor 26 proceeds to block 120 where an interrupt is generated and new control calculations are performed as discussed above.

Where $t_1 \geq T$ for a particular switching cycle, it is not necessary to turn switch 18 to the OFF state. Accordingly, in block 122, a test is performed to determine if $t_1 \geq T$. As discussed above, in most cases, $t_1 < T$ and processor advances to block 124, where switch 18 is turned OFF. If, on the other hand, $t_1 \geq T$, then block 124 is bypassed and switch 18 remains ON.

Sampling the input current $I_{in}$ at $t=t_1/2$ (i.e. in the middle of the ON period ($t_{ON}$) of switch 18) may help to avoid or reduce high frequency noise associated with the operation of switch 18. In practice, however, there is delay associated with switching. Referring to FIG. 4, there is a delay from the time that processor 26 sends an ON signal to switch driver 20 and the time that switch 18 is fully open. There is a similar delay from the time that processor 26 sends an OFF signal to switch driver 20 and the time that switch 18 is fully closed. Typically, these switching delays will be relatively constant and will depend on the components used for switch driver 20 and switch 18, but will be relatively independent of the switching frequency and other operational parameters of power supply 12. Because of this switching delay, it may be preferable to sample the input current $I_{in}$ at a time $t=t_1/2+\Delta$, where $\Delta$ is an estimate of the switching delay. Because of switching delays, the input current $I_{in}$ sampled at $t=t_1/2+\Delta$ may be more closely representative of the ideal median current $I_m$ and may yield better results for the control of the average input current $I_{in, avg}$ (see equations (6) and (8)). Those skilled in the art will appreciate that method 100 of FIG. 5 may be easily modified to sample the input current $I_{in}$ at $t=t_1/2+\Delta$ instead of $t=t_1/2$. In some embodiments, the duration of the delay $\Delta$ is less than or equal to 10% of the switching period T. In preferred embodiments, the duration of the delay $\Delta$ is less than or equal to 5% of the switching period T.

In other alternative embodiments (for example, where processor 26 and A/D converter 28 are sufficiently fast in comparison to the switching period T), the input current $I_{in}$ is sampled a plurality of times during a switching cycle and then the sampled values of input current $I_{in}$ are combined by processor 26 to determine an estimated value of the median current $I_m$ and an estimated value of $I_{in,avg}$. Such multiple sampling techniques may provide improved signal to noise ratio. In one particular embodiment, the input current $I_{in}$ is sampled twice per switching cycle at sampling times that are symmetric about $t_1/2$. For example, the sampling times may be $t=t_1/2\pm\delta$. With these sampling times, the sampled values of the input current $I_{in}$ may be combined by simple averaging to obtain an estimate of the median current $I_m$. This relationship can be seen by evaluating equation (1) at $t=t_1/2+\delta$ and at $t=t_1/2-\delta$ and taking the average of the results to obtain equation (8).

In some embodiments, the duration of the parameter $\delta$ is less than or equal to 10% of the switching period T. In preferred embodiments, the duration of the parameter $\delta$ is less than or equal to 5% of the switching period T. Those skilled in the art will appreciate that these multiple sampling techniques may also be combined with a delay $\Delta$ to account for switching related delays. In the example embodiment discussed above, the input current $I_{in}$ may be sampled twice per switching cycle at sampling times that are symmetric about $t_1/2+\Delta$. For example, the sampling times may be $t=t_1/2+\Delta\pm\delta$. In other embodiments, the input current $I_{in}$ is sampled a plurality of times during a given switching period at times synchronized with respect to $t_1/2$ or $t_1/2+\Delta$ and an estimate of the median current $I_m$ is determined by averaging the plurality of input current samples. Averaging the plurality of input current samples may comprise averaging pairs of current samples which are temporally symmetric with respect to $t_1/2$ or $t_1/2+\Delta$.

Figure 5A:
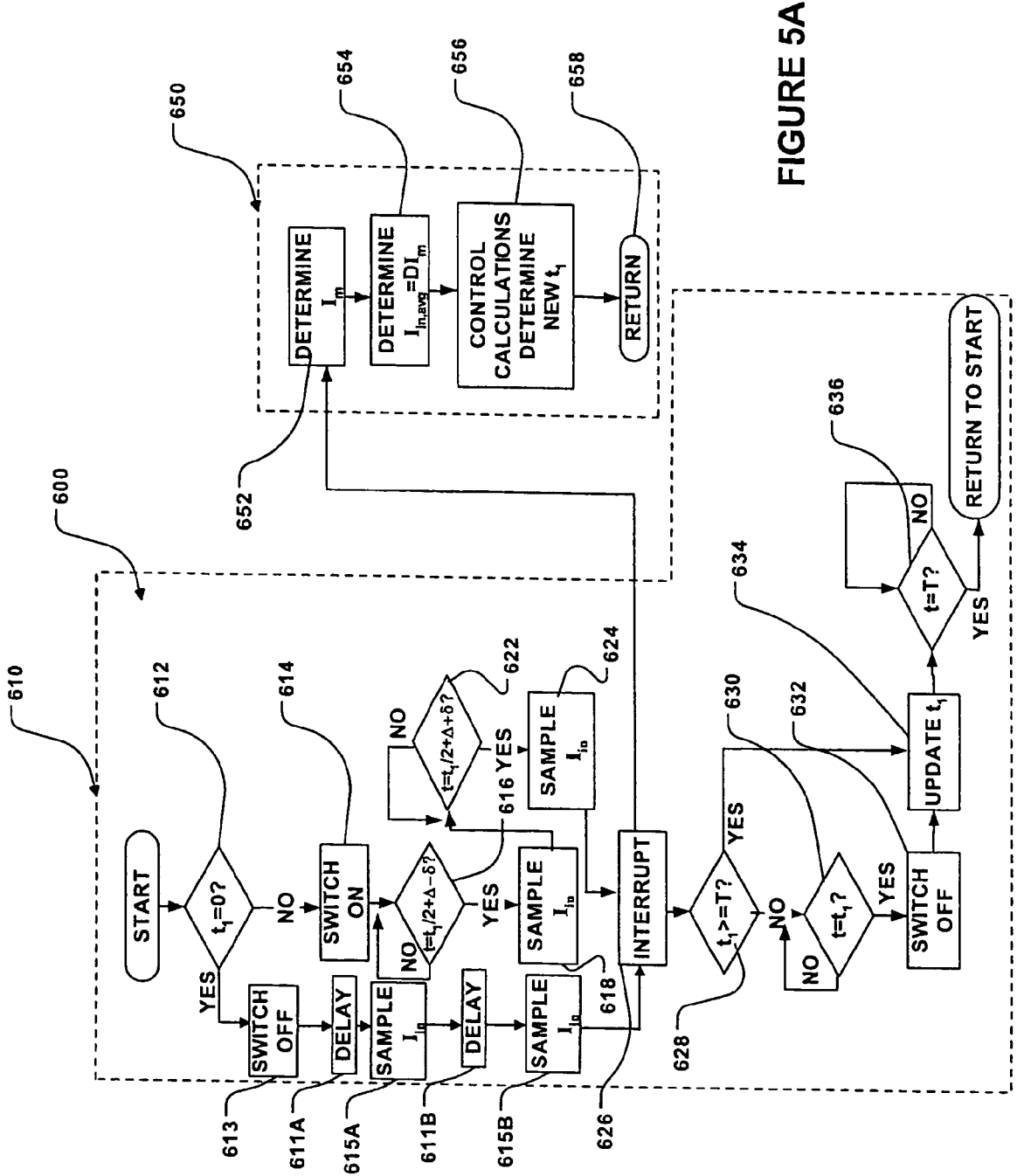
FIG. 5A is a schematic flow chart depicting a method for controlling the FIG. 4 power supply in accordance with an alternative embodiment of the invention.

FIG. 5A shows an alternative method 600 of controlling the average input current $I_{in,avg}$ of a switch mode power supply to track a desired average input current $I_{in,avg,des}$. Method 600 is similar to method 100 of FIG. 5 in many respects and comprises a main switching loop 610 and a software control loop 650. Method 600 commences in switching loop 610 at block 610, where a test is conducted to determine if the current value of $t_1=0$. In most cases, $t_1 \neq 0$ and switch 18 is turned ON in block 614. Processor 26 waits in block 616 for the first sampling time ($t=t_1/2+\Delta-\delta$), whereupon the first input current sample is obtained in block 618. Similarly, processor 26 waits in block 622 for the second sampling time ($t=t_1/2+\Delta+\delta$) and obtains the second input current sample in block 624.

When both samples are obtained, an interrupt is generated in block 626 and method 600 enters control loop 650. In block 654, processor obtains an estimate of the median current $I_m$. Preferably, the estimate of the median current $I_m$ is obtained by averaging the two sampled values of the input current $I_{in}$. In block 654, the estimate of the median input $I_m$ is used to obtain the average input current $I_{in,avg}$ by multiplying the median current $I_m$ with the current duty cycle D (see equation (6)). In block 656, processor 26 performs control calculations to determine a new duty cycle D (i.e. a new value for $t_1$) that will make the average input current $I_{in,avg}$ track the desired average input current $I_{in,avg,des}$. After calculating the new duty cycle D, control loop 650 concludes at block 658 and method 600 returns to the main loop 610 at block 628.

In block 628, processor 26 performs a test to determine if $t_1 \geq T$. In most cases, $t_1 < T$ and processor 26 proceeds to block 630, where it waits until $t=t_1$. At $t=t_1$, switch 18 is turned OFF in block 632. In block 634, the duty cycle D is updated with the new duty cycle value D that was determined in block 656. In block 636, processor 26 waits until the current switching cycle is complete (i.e. at $t=T$) before returning to block 612 to start a new cycle. Before commencing each new switching period, processor 26 may reset its time counter to $t=0$.

Method 600 incorporates techniques for the special cases where $t_1=0$ (switch 18 always OFF) and $t_1 \geq T$ (switch 18 always ON). Block 612 is a test to determine if switch 18 may remain in an OFF state. If $t_1=0$, then method 600 bypasses block 614 (i.e. where switch 18 is turned ON) and proceeds through blocks 613, 611A, 615A, 611B and 615B, where method 600 ensures that switch 18 is turned (or remains) OFF (block 613), delays for suitable periods of time (blocks 611A, 611B) and obtains two samples of the input current $I_{in}$ (blocks 615A, 615B). Suitable delays for blocks 611A, 611B may depend on the switching time for switch 18. Delays for blocks 611A, 611B may also depend on delays associated with switch controller 20 and an estimate of switch parasitics. In alternative embodiments, an assumption is made that the sampled input current values $I_{in}$ are both zero. After determining a pair of values for $I_{in}$, method 600 proceeds to block 626 where an interrupt is generated and control calculations are performed as discussed above. Block 628 is a test to determine if switch 18 may remain in an ON state. If $t_1 \geq T$, then the method bypasses block 632 (i.e. where switch 18 is turned OFF) and proceeds to block 634.

Figure 4A:
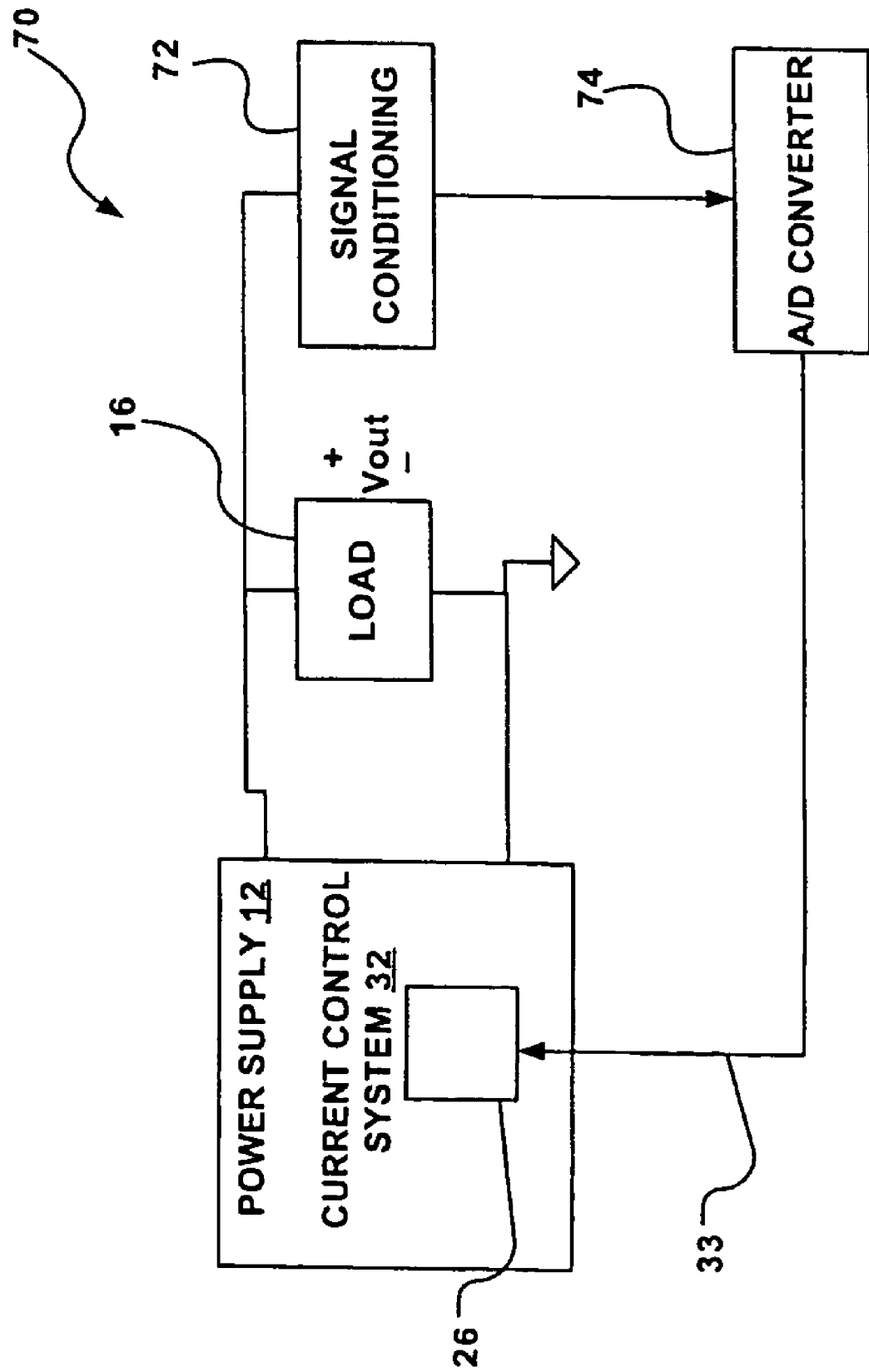
FIG. 4A is a schematic circuit diagram of an optional output voltage control system which may be used in conjunction with any of the embodiments of the present invention.

In some embodiments of the invention, where output voltage $V_{out}$ must be regulated, it is useful to include an additional output voltage control system. FIG. 4A schematically depicts a block diagram of a particular embodiment of an output voltage control system 70 suitable for use with power supply 12 and current control system 32 (FIG. 4). Output voltage control system 70 provides samples of the output voltage $V_{out}$ to processor 26 on line 33 (FIG. 4). Processor 26 uses these sampled values of the output voltage $V_{out}$ to determine a desired average input current $I_{in,avg,des}$. Current control system 32 may then use this desired average input current $I_{in,avg,des}$ to control the average input current $I_{in,avg}$ as described above.

In the illustrated embodiment, voltage control system 70 comprises signal conditioning circuitry 72, A/D converter 74 and processor 26. In alternative embodiments, voltage control loop 70 comprises its own independent processor. In other alternative embodiments, A/D converter 74 is incorporated in processor 26. Signal conditioning circuitry 72 preferably comprises a suitable scaling amplifier, which scales the output voltage $V_{out}$ across the terminals of load 16 to a range suitable for input to A/D converter 74. In some embodiments, signal conditioning circuitry 72 also includes filters for removing noise.

Processor 26 may trigger A/D converter 74 to obtain digital samples of the output voltage $V_{out}$ at regular intervals. Alternatively, A/D converter 74 may be programmed to automatically obtain digital samples of the output voltage $V_{out}$ and to interrupt processor 26 when a sample of the output voltage $V_{out}$ is available. Controller 26 may then use current and past values of the digitally sampled output voltage $V_{out}$ together with the desired output voltage $V_{out,des}$ and conventional control techniques to determine a desired average input current $I_{in,avg,des}$. Such control techniques may include, for example, P, PD, PI, PID and state space control algorithms, such as model-predictive control.

In operation, processor 26 executes two simultaneous control loops. In the current control loop (of current control system 32), sampled values of the input current $I_{in}$ are used to determine a duty cycle D which will make the average input current $I_{in,avg}$ track the desired average input current $I_{in,avg,des}$. In the voltage control loop (of voltage control system 70), sampled values of the output voltage $V_{out}$ are used to determine a desired average input current $I_{in,avg,des}$ that will make the output voltage $V_{out}$ track a desired output voltage $V_{out,des}$.

Preferably, the voltage control loop (of voltage control system 70) loops more slowly than the current control loop (of current control system 32). In this manner, current control system 32 can ensure that the average input current $I_{in,avg}$ closely and rapidly tracks the desired average input current $I_{in,avg,des}$, while voltage control system 70 adjusts the desired average output current $I_{in,avg,des}$ relatively more slowly. It will be appreciated that if current control system 32 ensures that the average input current $I_{in,avg}$ tracks the desired average input current $I_{in,avg,des}$ and the sampled value of the output voltage $V_{out}$ is lower than the desired output voltage $V_{out,des}$, then voltage control system 70 should increase the desired average output current $I_{in,avg,des}$. Similarly, if current control system 32 ensures that the average input current $I_{in,avg}$ tracks the desired average input current $I_{in,avg,des}$ and the sampled value of the output voltage $V_{out}$ is higher than the desired output voltage $V_{out,des}$, then processor 26 should decrease the desired average output current $I_{in,avg,des}$.

Figure 6:
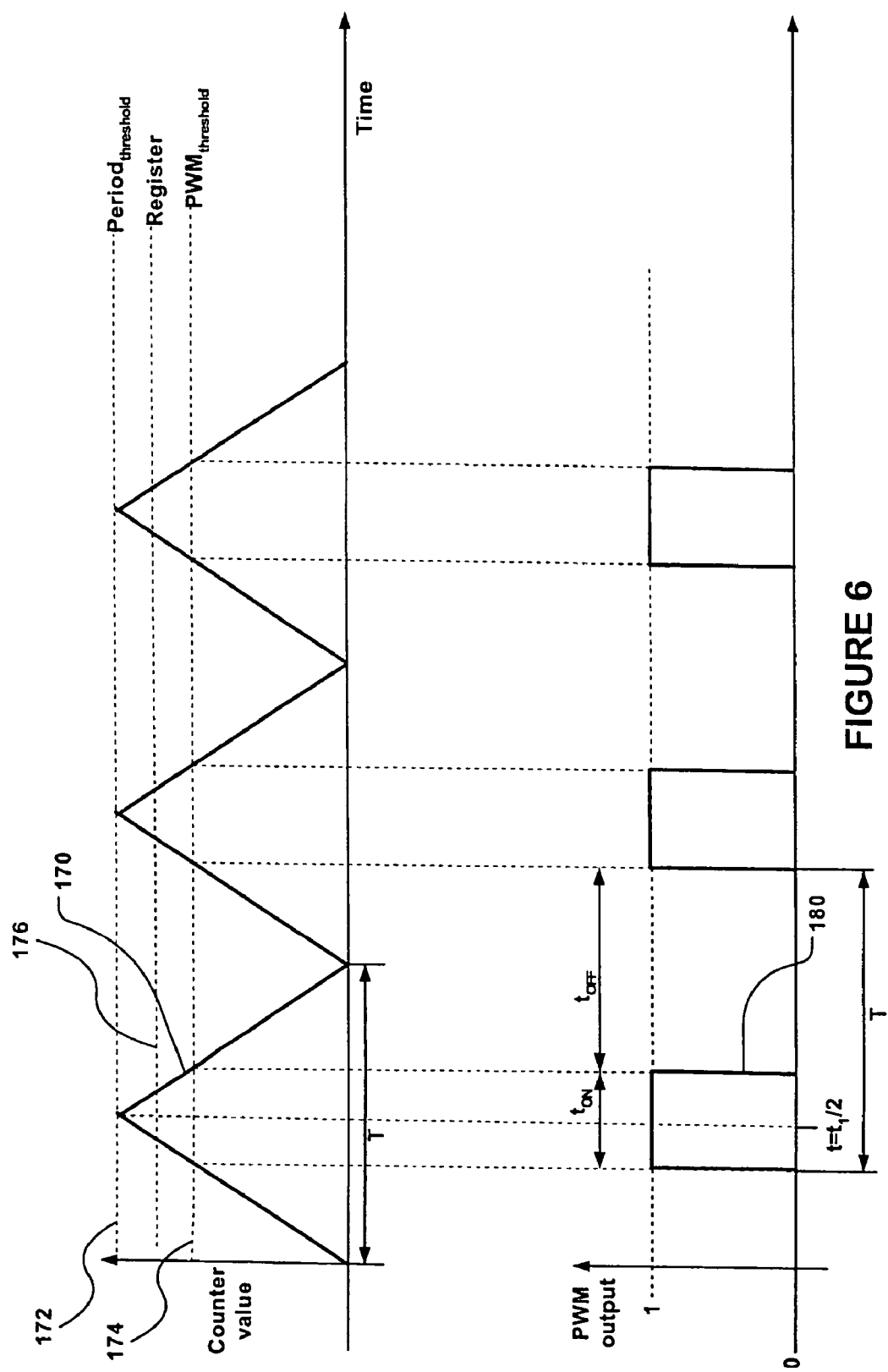
FIG. 6 schematically depicts a timer counter, a number of hardware registers and the resultant PWM digital output according to one possible technique for implementing the method of FIG. 5.

FIG. 6 schematically depicts a timer counter 170 and the resultant PWM digital output 180 over a number of switching cycles. In practice, timer counter 170 may be a counter function in processor 26, which may be used in conjunction with a $Period_{threshold}$ register (shown schematically as line 172 in FIG. 6), to provide the triangular shape profile of timer counter 170. As discussed above, in preferred embodiments of the invention, the period T of the switching cycle remains constant and the duty cycle D is varied by processor 26 to control the average input current $I_{in,avg}$. In such embodiments, a constant value $Period_{threshold}$ is loaded into the period threshold register 172.

At the beginning of a switching cycle, counter 170 begins counting at zero and is periodically incremented. Counter 170 continues to be periodically incremented until the value of counter 170 reaches the value stored in the period threshold register 172, at which point counter 170 reverses direction and is periodically decremented until counter 170 reaches zero. When counter 170 reaches zero, a new switching cycle begins and counter 170 is periodically incremented again. Counter 170 may be schematically represented by a triangular-shaped profile that is periodic with the switching period T of the power supply 12, as shown in FIG. 6. Those skilled in the art will appreciate that the increment/decrement period of counter 170 (typically a multiple of the internal clock of processor 26) is many times faster than the period T of the switching cycle.

As discussed above, processor 26 may use pulse width modulation (PWM) to effect the duty cycle D of switch 18. A typical PWM digital output 180 is shown in FIG. 6 over a number of switching cycles. Typically, PWM output 180 will be a digital "1" when switch 18 should be in an ON state (i.e. during the time $t_{ON}$) and PWM output 180 will be a digital "0" when switch 18 should be in an OFF state (i.e. during the time $t_{OFF}$). Digital PWM output 180 may be directed from processor 26 to switch driver 20 (see FIG. 4). Switch driver 20 may interpret the digital PWM output 180 and apply the appropriate switching signals to switch 18. In alternative embodiments, switch driver 20 is not required and digital PWM output 180 drives switch 18 directly. As shown in FIG. 6, digital PWM output 180 is a digital "1" for a period of time $t_{ON}$ and then switches to a digital "0" for a period of time $t_{OFF}$.

Processor 26 may comprise a PWM threshold register (shown schematically as line 174 in FIG. 6). Counter 170 and PWM threshold register 174 may be used to determine when digital PWM output 180 should be a "1" or "0". Processor 26 may load a value $PWM_{threshold}$ into PWM threshold register 174. $PWM_{threshold}$ may have a value equal to:

$$PWM_{threshold} = (1-D) \, Period_{threshold} \quad (9)$$

where $Period_{threshold}$ is the constant value stored in period threshold register 172. At the beginning of a cycle, PWM output 180 is "0". Counter 170 is also zero at the beginning of a cycle and is incremented periodically as described above. When counter 170 reaches the value of PWM threshold register 174, PWM output 180 switches from "0" to "1" and switch 18 is turned ON. PWM output 180 stays as a digital "1" for the entire time that counter 170 is greater than or equal to the value stored in PWM threshold register 174. As discussed above, counter 170 eventually reaches the value of period threshold register 172 and is then periodically decremented. When counter 170 reaches PWM threshold 174 again, PWM output 180 switches from "1" to "0" and switch 18 is turned OFF. It can be seen by comparing counter 170 to PWM output 180 that the actual switching cycle of switch 18 is out of phase with the cycle of counter 170. Although not explicitly shown in FIG. 6, processor 26 may update the value of PWM threshold register 174 once every switching cycle (or every plurality of switching cycles) when the new value of the duty cycle D is determined (see block 128 of FIG. 5).

Counter 170 may also be used to trigger A/D converter 28 to sample the input current $I_{in}$ as discussed above. In one particular embodiment, processor 28 triggers AID converter 28 at $t=t_1/2$. As seen in FIG. 6, $t=t_1/2$ occurs when the value of counter 170 reaches the value of period threshold register 172. A sampling interrupt may be generated in each cycle at the time that the value of counter 170 reaches the value of period threshold register 172 and, upon the occurrence of this sampling interrupt, processor 26 may cause A/D converter 28 to obtain a digital sample of the input current $I_{in}$.

As discussed above, it may be preferable to include a sampling delay $\Delta$ to account for delays associated with the switching hardware. Such a sampling delay $\Delta$ may be implemented in a number of ways. For example, a sampling delay $\Delta$ may be built into a subroutine associated with the sampling interrupt. Alternatively, a different register may be used to generate a sampling interrupt. A suitable register is shown schematically as line 176 in FIG. 6. When the value of counter 200 is equal to the value of register 176, a sampling interrupt may be generated. Logic may be built into the sampling interrupt subroutine to ensure that processor 26 only triggers AID converter 28 once per cycle. For example, a sampling interrupt may occur once when counter 170 is incrementing and again when counter 170 is decrementing (i.e. at both times that the value of counter 170 equals the value of register 176), but the sampling interrupt subroutine ensures that processor 26 only triggers A/D converter 28 when counter 170 is decrementing (i.e. at $t=t_1/2+\Delta$).

In alternative embodiments discussed above, the input current $I_{in}$ is sampled twice per switching cycle at times symmetric about $t=t_1/2$ (i.e. at $t=t_1/2\pm\delta$). Processor 26 can handle this using register 176, which generates a pair of symmetrical interrupts at $t=t_1/2\pm\delta$. One such interrupt occurs at $t=t_1/2-\delta$ (i.e. while counter 170 is incrementing and the value of counter 170 equals the value of register 176). The other interrupt occurs at $t=t_1/2+\delta$ (i.e. while counter 170 is decrementing and the value of counter 170 equals the value of register 176). When sampling twice per cycle, the time between samples (i.e. $2\delta$) is preferably sufficient to allow A/D converter 28 to process an A/D conversion (i.e. obtain a digital sample of $I_{in}$). Using techniques similar to those described above, counter 170 may be used to trigger a plurality of samples in each switching cycle and to account for switching delay. For example, counter 170, register 176 and a sampling interrupt subroutine incorporating a software delay may be configured to sample at $t=t_1/2+\Delta\pm\delta$. Alternatively, a hardware delay of $\Delta$ may be used together with counter 170 and register 176 to sample at $t=t_1/2+\Delta\pm\delta$. Those skilled in the art will appreciate that there are many possible alternative configurations for causing appropriately selected and/or programmed hardware and/or software to track sampling times and to generate sampling interrupts (if required). The invention is not limited to the implementational techniques depicted and described above.

Figure 7:
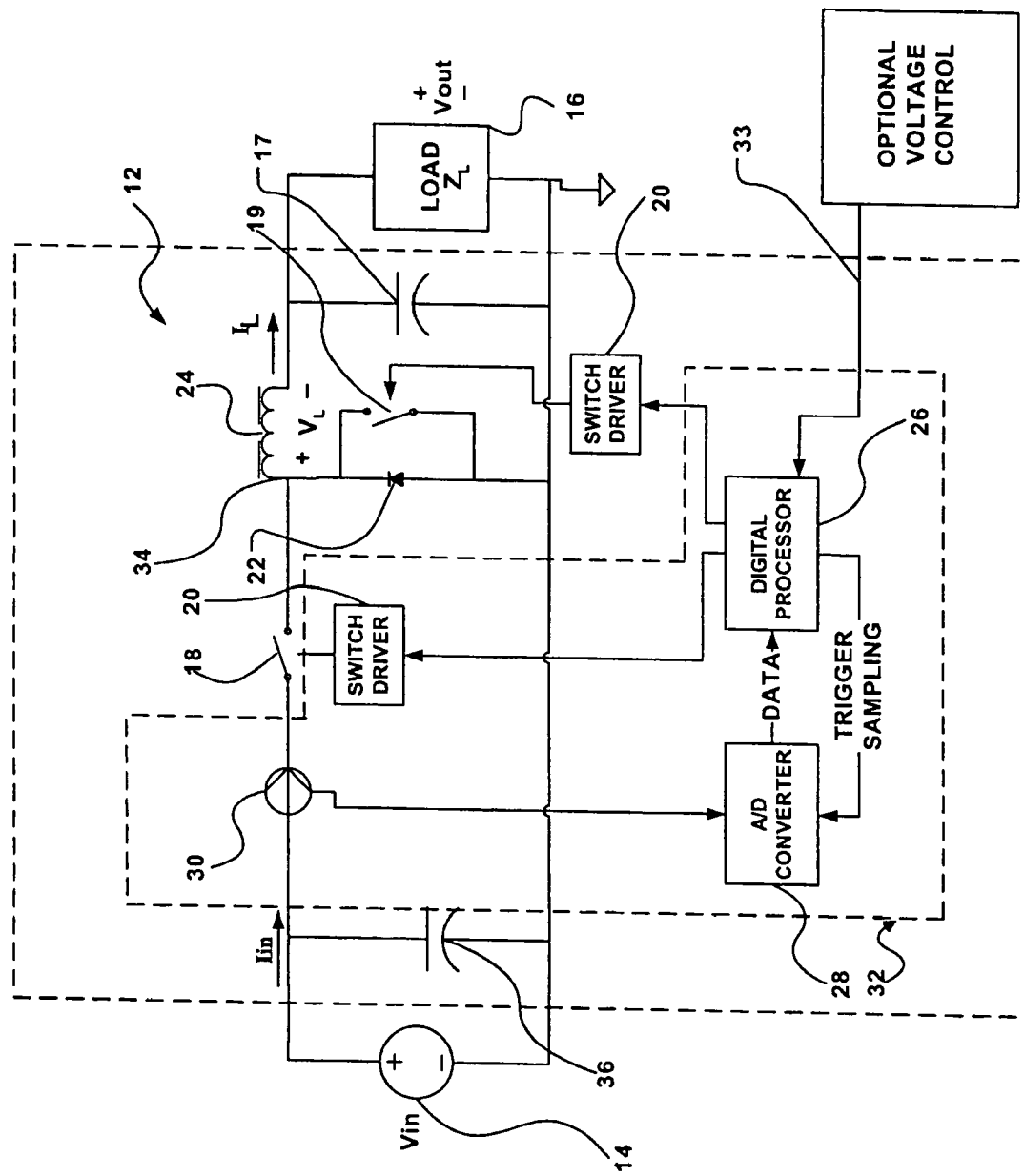
FIG. 7 is a schematic circuit diagram of a switch mode power supply having a synchronous buck topology together with an associated control system according to a particular embodiment of the invention.

FIG. 7 depicts an alternative embodiment of the invention implemented in a power supply 12 having a configuration referred to as a "synchronous buck" topology. In power supply 12 of FIG. 7, similar reference numerals are used to denote components similar to those in the FIG. 4 embodiment. In the embodiment of FIG. 7, power supply 12 comprises an additional switch 19, which is connected in parallel with diode 22 and which is controlled by processor 26. In the FIG. 7 embodiment, processor 26 outputs digital PWM signals corresponding to both switch 18 and switch 19 and these digital PWM signals are received by switch drivers 20. In turn, switch drivers 20 output the signals necessary to independently turn switches 18, 19 ON and OFF.

Preferably, switch 19 operates in a manner that is complementary (i.e. opposite) to that of switch 18. When switch 18 is ON and current is conducted from power source 14 through switch 18 and inductor 24, switch 19 is preferably maintained in an OFF (i.e. open) state, such that diode 22 is reverse biased and all current from power source 14 flows through inductor 24 to load 16. However, when switch 18 is turned OFF, switch 19 is preferably in an ON state, such that inductor 24 is supplied with current through switch 19 (i.e. bypassing diode 22). The inclusion of switch 19 may improve the efficiency of power supply 12, because when switch 18 is OFF, switch 19 is ON. Switch 19 provides a current path directly to inductor 24, avoiding the forward bias voltage drop associated with diode 22. In contrast, in the FIG. 4 embodiment when switch 18 is OFF, current must be supplied to inductor 24 through diode 22 which will typically have a forward bias voltage drop.

In some embodiments, processor 26 comprises a pair of complimentary digital PWM outputs (i.e. digital PWM outputs where the digital values are the inverse of one another). With such processors, the provision of an extra PWM output corresponding to switch 19 is relatively simple, as the PWM output for switch 19 is complimentary to PWM output 210 (FIG. 6) for switch 18. In other embodiments, it will be necessary to provide a second PWM output that is complimentary to PWM output 210. Such a complementary PWM output may be created from PWM output 210 in hardware, using a NOT gate for example, or in software, using a NOT operation for example. It may be advantageous to provide a short delay between the switching of the two different PWM output signals to avoid cross-conduction and unnecessary switching losses. Such a delay may be implemented in hardware or software and may be a function of the switching times for switches 18, 19.

Figure 8:
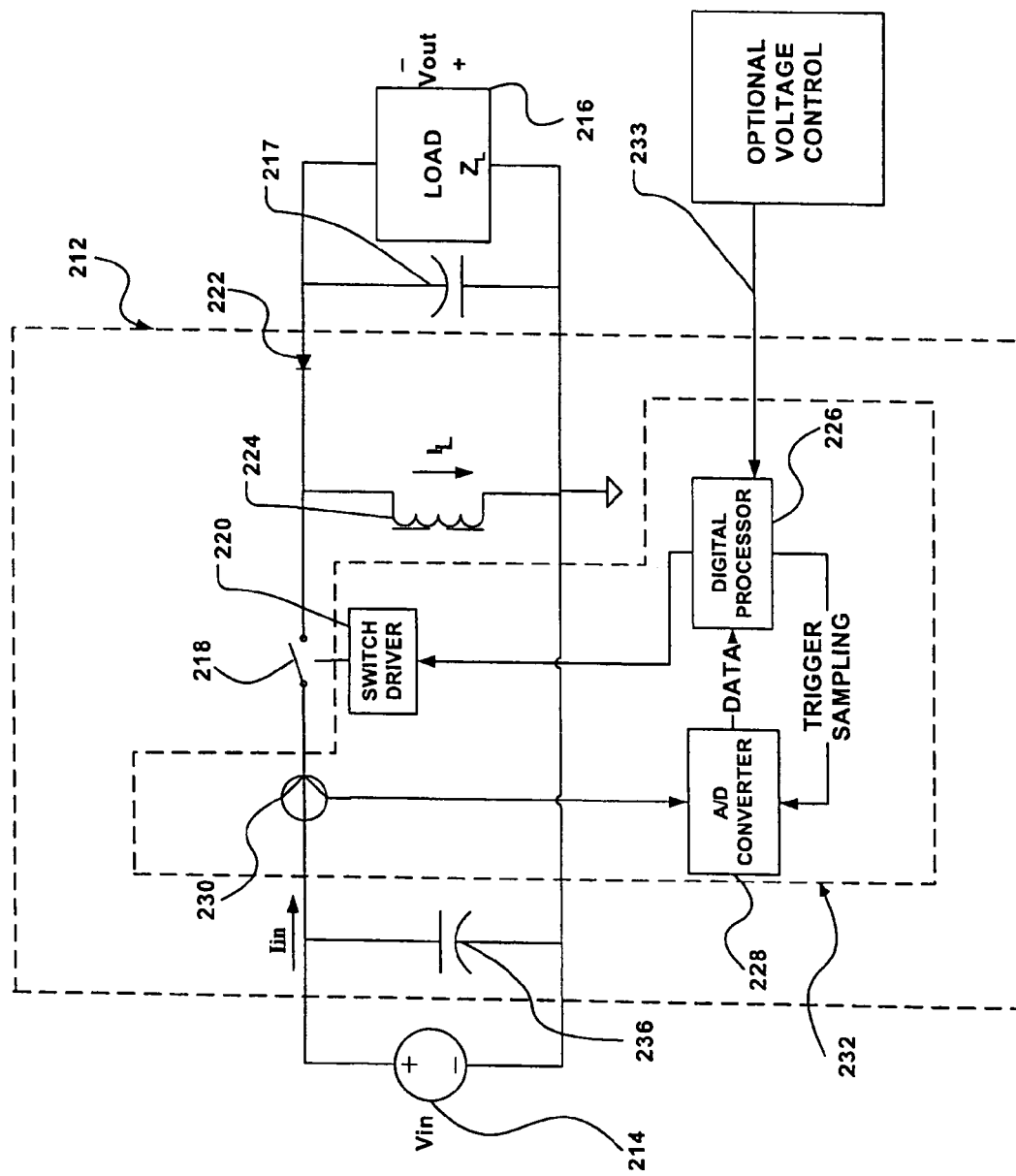
FIG. 8 is a schematic circuit diagram of a switch mode power supply having a flyback topology together with an associated control system in accordance with a particular embodiment of the invention.
Figure 8A:
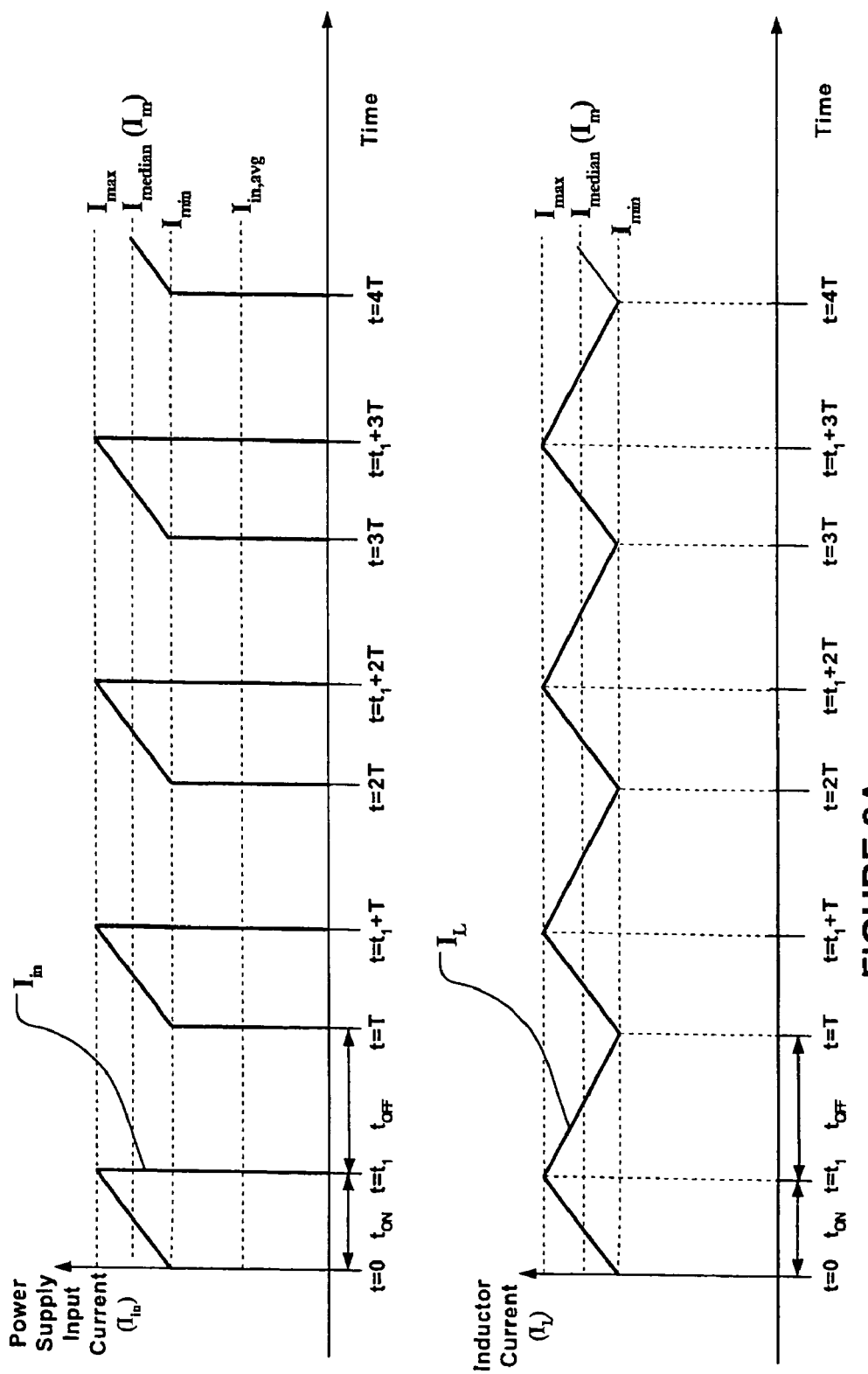
FIG. 8A is a schematic illustration of a number of the current waveforms associated with the FIG. 8 power supply.

FIG. 8 depicts an alternative embodiment of the invention implemented in a power supply 212 having a configuration referred to as a "flyback" topology. Power supply 212 couples DC power source 214 to a load 216. In the illustrated embodiment, power supply 212 comprises a switch 218, a diode 222, an inductor 224, an optional input filter (represented by capacitor 236), a capacitive output filter 217 and a corresponding control system 232. Steady state waveforms for the inductor current $I_L$ and the input current $I_{in}$ associated with power supply 212 are depicted in FIG. 8A. While the waveforms of FIG. 8A depict a continuous conduction mode of operation, those skilled in the art will appreciate that power supply 212 may also operate in a discontinuous conduction mode.

For the purpose of explaining the basic operation of power supply 212 as illustrated in FIGS. 8 and 8A, it is assumed that power supply 212 operates with a constant switching period T and a constant duty cycle $D=t_1/T$. Switch 218 is turned ON (i.e. closed) for a period of time $0<t<t_1=DT$ ($t_{ON}$). During the ON period ($t_{ON}$) of switch 218, the input current $I_{in}$ and the corresponding inductor current $I_L$ increase as current flows from power source 214, through inductor 224 to ground. This inductor current $I_L$ causes charge to be built up in inductor 224. The switching period T, the components of power supply 212, load 216 and power source 214 are preferably selected such that power supply 212 has response times that are large in comparison to the switching period T. Consequently, the voltages $V_{in}$ and $V_{out}$ are approximately constant and the rate of increase of the inductor current $I_L$ is approximately linear. During the ON period ($t_{ON}$) of switch 218 (i.e. $0<t<t_1=DT$), diode 222 is reverse biased, such that no current flows through diode 222 and current is supplied to load 216 by capacitor 217.

At time $t=t_1=DT$, switch 218 transitions from its ON state to its OFF state for the balance of the switching period T (i.e. for $t_1=DT<t<T$). When switch 218 is turned OFF at $t=t_1$, the input current $I_{in}$ is reduced to zero and the voltage across inductor 224 changes polarity in order to maintain the inductor current $I_L$. Consequently, diode 222 is forward biased and current is drawn through diode 222 as inductor 224 discharges and the inductor current $I_L$ decreases. In the flyback topology of power supply 212, the voltage at load 16 ($V_{out}$) has the polarity shown in FIG. 8.

Despite the different topology of power supply 212, the behaviors of the input current $I_{in}$ and the inductor current $I_L$ for power supply 212 are substantially similar to the behaviors of the input current $I_{in}$ and the inductor current $I_L$ described above for the buck topology power supply 12 of FIG. 4. Accordingly, current control system 232, which comprises current sensor 230, A/D converter 228, processor 226 and switch drivers 220, may operate in substantially the same manner as described above to control the average input current $I_{in,avg}$, causing it to track a desired average input current $I_{in,avg,des}$. In accordance with this control technique, during a given switching period T, the input current $I_{in}$ may be sampled at $t=t_1/2$, where $t_1$ represents the time that switch 218 transitions from an ON state to an OFF state, the average input current $I_{in,avg}$ may be determined by multiplying the sampled input current $I_{in}$ with the current duty cycle $D=t_1/T$ and any conventional control technique may be used to determine a new duty cycle D (or equivalently a new $t_1$) to be applied to switch 218 during a subsequent switching period. Continually updating the duty cycle D in this manner ensures that the average input current $I_{in,avg}$ tracks the desired average input current $I_{in,avg\_des}$.

In an alternative embodiment of the flyback topology, power supply 212 is made "synchronous" by incorporating an additional switch (not shown) for bypassing diode 222. Such a bypass switch would operate in a manner that is complementary (i.e. opposite) to switch 218, such that the bypass switch is ON whenever switch 218 is OFF and the bypass switch is OFF whenever switch 218 is ON. When switch 218 is turned OFF, the bypass switch is turned ON to provide a direct current path which bypasses diode 222, avoiding its associated forward bias voltage drop.

Figure 9:
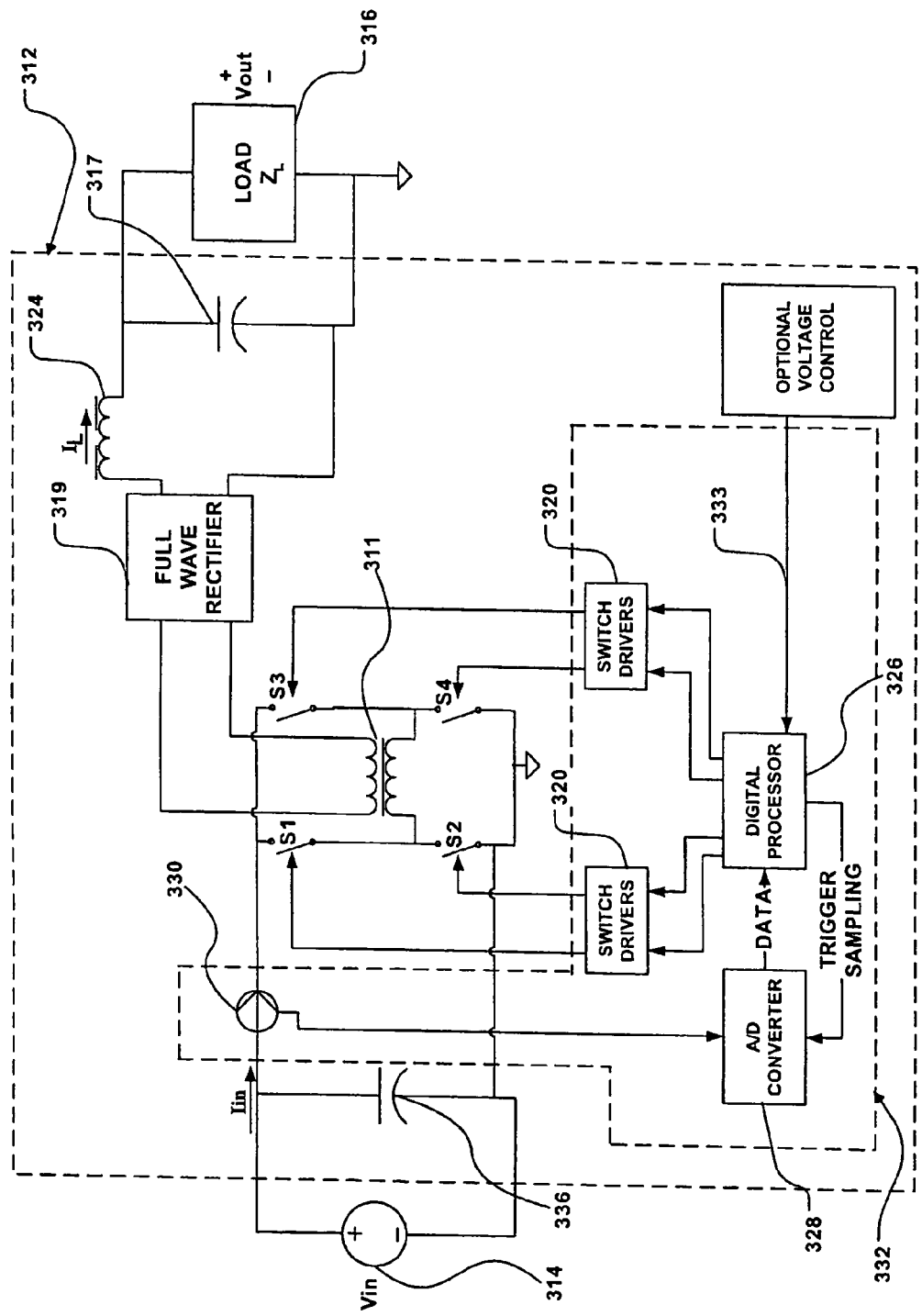
FIG. 9 is a schematic circuit diagram of a switch mode power supply having a bridge topology together with an associated control system according to a particular embodiment of the invention.

FIG. 9 shows another alternative embodiment of the invention implemented in a power supply 312 having a configuration referred to as a "bridge" topology. Power supply 312 couples a DC power source 314 to a load 316. In the illustrated embodiment, power supply 312 comprises four switches S1, S2, S3, S4, a transformer 311, an inductor 324, a full wave rectifier 319, an optional input filter (represented by capacitor 336), a capacitive output filter 317 and a corresponding control system 332. Switches S1, S2, S3, S4 are connected in a bridge configuration around the primary winding of transformer 311. Switches S1 and S4 form a first switch pair that operates in unison, such that switches S1 and S4 are always ON at the same time and OFF at the same time. Similarly, switches S2 and S3 form a second switch pair, wherein switches S2 and S3 are always ON at the same time and OFF at the same time.

Figure 9A:
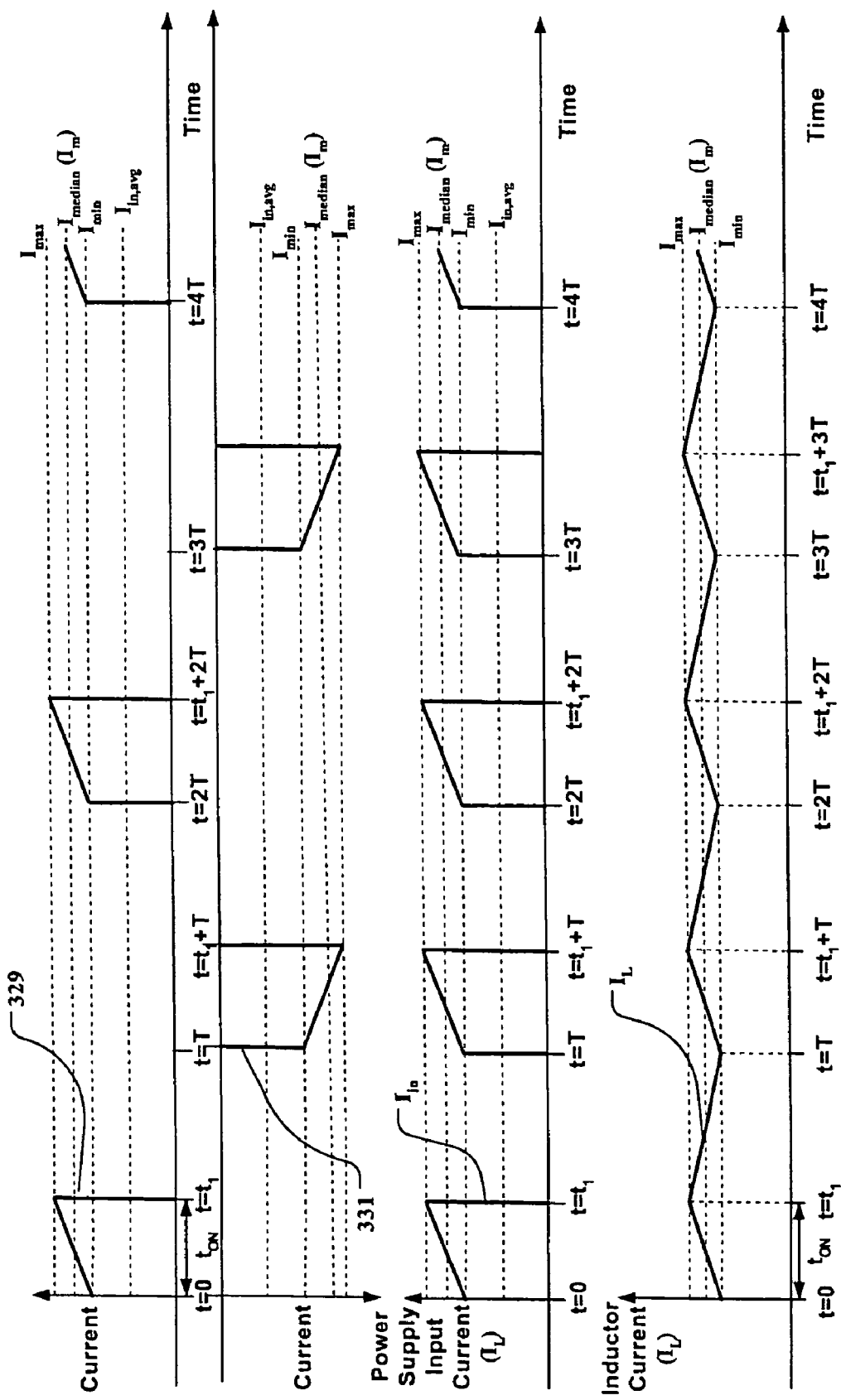
FIG. 9A is a schematic illustration of a number of the current waveforms associated with the FIG. 9 power supply.

In operation, switch pair S1, S4 and switch pair S2, S3 are turned ON and OFF periodically with a period of 2T, which is twice the power supply switching period T experienced by inductor 324 and load 316. FIG. 9A depicts a number of steady state waveforms representative of current signals associated with power supply 312. In FIG. 9A, signal 329 represents the current through switch pair S1, S4, signal 331 represents the current through switch pair S2, S4, $I_{in}$ represents the input current and $I_L$ represents the inductor current. As shown in FIG. 9A, the input current $I_{in}$ is the sum of the absolute values of the current 329 through switch pair S1, S4 and the current 331 through switch pair S2, S3. While the waveforms of FIG. 9A depict a continuous conduction mode of operation, those skilled in the art will appreciate that power supply 312 may also operate in a discontinuous conduction mode.

For the purpose of explaining the basic operation of power supply 312 as illustrated in FIGS. 9 and 9A, it is assumed that power supply 312 operates with a constant switching period T and a constant duty cycle $D=t_1/T$ and that transformer 311 is an ideal transformer. One of switch pair S1, S4 or switch pair S2, S3 is turned ON every switching period T. For example, in the waveforms shown in FIG. 9A, switch pair S1, S4 is turned ON first, for a time $0<t<t_1=DT$. During this time when switch pair S1, S4 is ON ($t_{ON}$), current signal 329 flows from power source 314, through switch S1, the primary winding of transformer 311 and switch S4, to ground. This current creates a corresponding signal in the secondary winding of transformer 311, which is rectified by rectifier 319. The rectified signal causes the inductor current $I_L$ in inductor 324 to increase and supplies current to load 316. Consequently, charge is built up in inductor 324. Preferably, the switching period T, the components of power supply 312, load 316 and power source 314 are selected such that power supply 312 has response times that are large in comparison to the switching period T. Consequently, the voltages $V_{in}$ and $V_{out}$ are approximately constant in the steady state and the increase in the inductor current $I_L$ and the corresponding increase in the current 329 through switch pair S1, S4 may be treated as approximately linear.

At $t=t_1=DT$, switch pair S1, S4 is turned OFF for the balance of the switching period T (i.e. for $t_1=DT<t<T$). When switch pair S1, S4 is turned OFF at $t=t_1$, the input current $I_{in}$ is reduced to zero and the flow of inductor current $I_L$ is maintained through rectifier 319. Those skilled in the art will appreciate that rectifier 319 may contain one or more diodes, switches, transistors or the like which may facilitate the flow of inductor current $I_L$ when switch pair S1, S4 is turned OFF. For $t_1=DT<t<T$, the inductor current $I_L$ decreases until switch pair S2, S3 is turned ON at $t=T$.

At $t=T$, switch pair S2, S3 is turned ON for a time $T<t<(T+t_1)=(D+1)T$. During this time when switch pair S2, S3 is ON, current signal 331 flows from power source 314, through switch S3, primary winding of transformer 311 and switch S2, to ground. This current creates a corresponding signal in the secondary winding of transformer 311, which is rectified by rectifier 319. The rectified signal causes the inductor current $I_L$ in inductor 324 to increase and supplies current to load 316. As with the previous switching cycle involving switch pair S1, S4, charge is built up in inductor 324, causing a corresponding linear increase in the inductor current $I_L$ and a corresponding linear increase in the current 331 through switch pair S2, S3.

At $t=(T+t_1)=(D+1)T$, switch pair S2, S3 is turned OFF for the balance of the switching period (i.e. for $T+t_1=(D+1)T<t<2T$). When switch pair S2, S3 is turned OFF at $t=T+t_1$, the input current $I_{in}$ is reduced to zero and the flow of inductor current $I_L$ is maintained through rectifier 319. For $T+t_1=(D+1)T<t<2T$, the inductor current $I_L$ decreases until switch pair S1, S4 is turned ON again at $t=2T$ in a subsequent switching cycle.

Current control system 332 comprises current sensor 330, A/D converter 328, processor 326 and switch drivers 320. Current control system 332 may operate using techniques similar to those described above to control the average input current $I_{in,avg}$, so that it tracks a desired average input current $I_{in,avg,des}$. In accordance with such control techniques, the input current $I_{in}$ may be sampled once during a given switching period T. The input current sampling may occur at a time $t=t_1/2$ where $t_1$ represents the time that the relevant one of the switch pairs (S1, S4 or S2, S3) transitions from its ON state to its OFF state. The average input current $I_{in,avg}$ may then obtained in accordance with equation (6) by multiplying the sampled input current $I_{in}$ with the current duty cycle $D=t_1/T$. Any conventional control technique may be used by processor 326 to determine a new duty cycle D (or equivalently a new $t_1$) to be applied to the relevant switch pair during a subsequent switching cycle. Continually updating the duty cycle D in this manner ensures that the actual average input current $I_{in,avg}$ tracks the desired average input current $I_{in,avg,des}$.

Because control system 332 alternates between activating switch pair S1, S4 and activating switch pair S2, S3, the actual switching frequency of these switch pairs is half the switching frequency of power supply 312 (i.e. the switching frequency of input current $I_{in}$ and inductor current $I_L$) When switch pair S1, S4 is turned ON and a sample of the input current $I_{in}$ is obtained, the next update of duty cycle D may be applied to the operation of switch pair S2, S3. Similarly, when switch pair S2, S3 is turned ON and a sample of the input current $I_{in}$ is obtained, the next update of duty cycle D may be applied to the operation of switch pair S1, S4. In this manner, processor 326 updates the duty cycle for each switch pair S1, S4 and S2, S3 once every 2T, but effectively updates the duty cycle D of power supply 312 once every switching period T. In alternative embodiments, the duty cycle D is updated once for every plurality of switching periods T of power supply 312.

In alternative embodiments of power supply 312, transformer 311 comprises two substantially similar secondary windings, each of which is activated by a corresponding one of switch pairs S1, S4 and S2, S3 and rectifier 319 is replaced with a corresponding pair of diodes. The operation and control of such a power supply are substantially similar to that described above.

Figure 10:
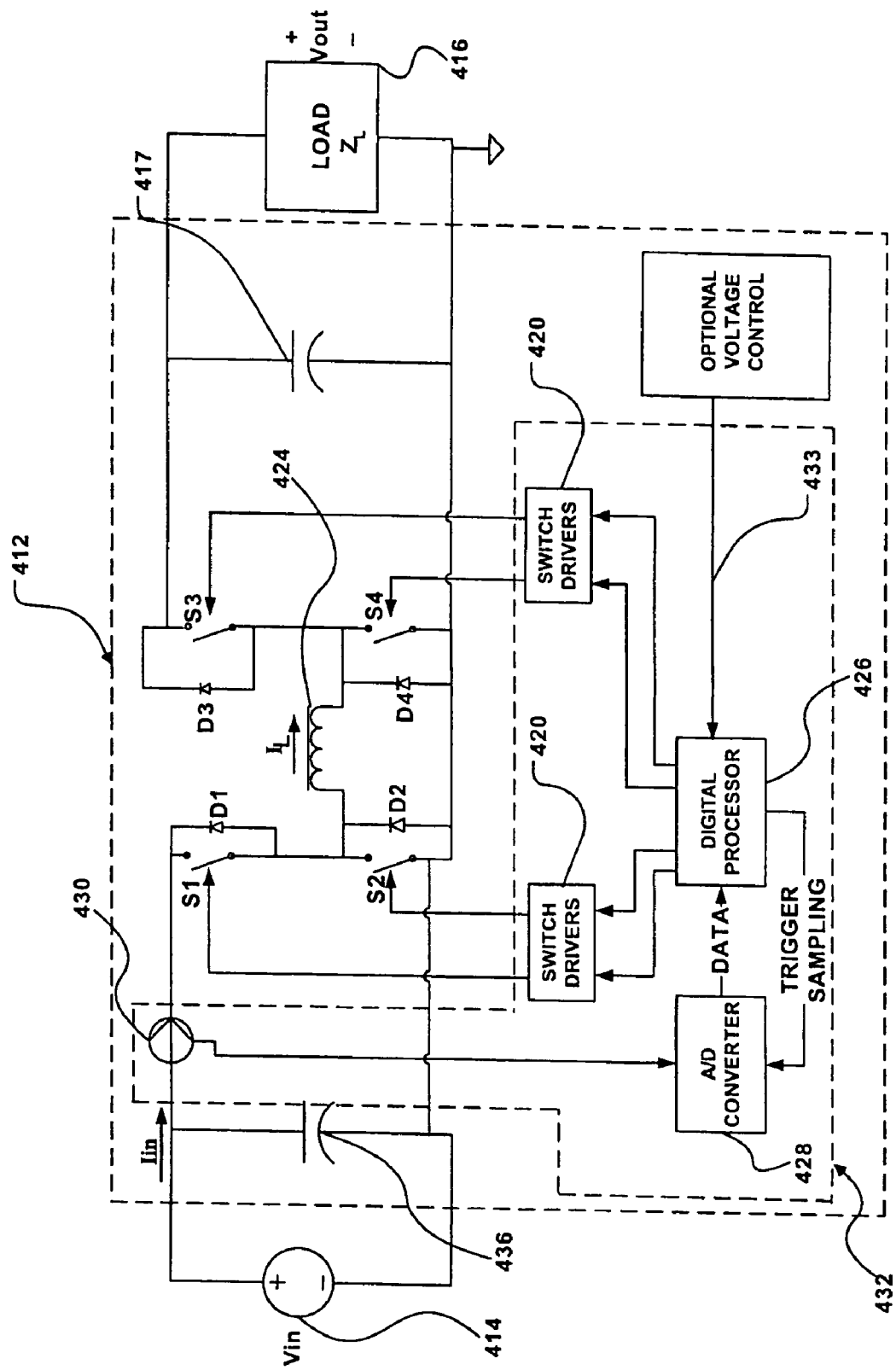
FIG. 10 is a schematic circuit diagram of a switch mode power supply having a buck-boost topology together with an associated control system in accordance with a particular embodiment of the invention.

FIG. 10 depicts another alternative embodiment of the invention implemented in a power supply 412 having a configuration referred to as a "buck-boost" topology. Power supply 412 couples a DC power sources 414 to a load 416.

In the illustrated embodiment, power supply 412 comprises four switches S1, S2, S3, S4, four diodes D1, D2, D3, D4, an inductor 424, an optional input filter (represented by capacitive 436), a capacitive output filter 417 and a corresponding control system 432. Power supply 412 is capable of operating in a number of operational modes.

Figure 10A:
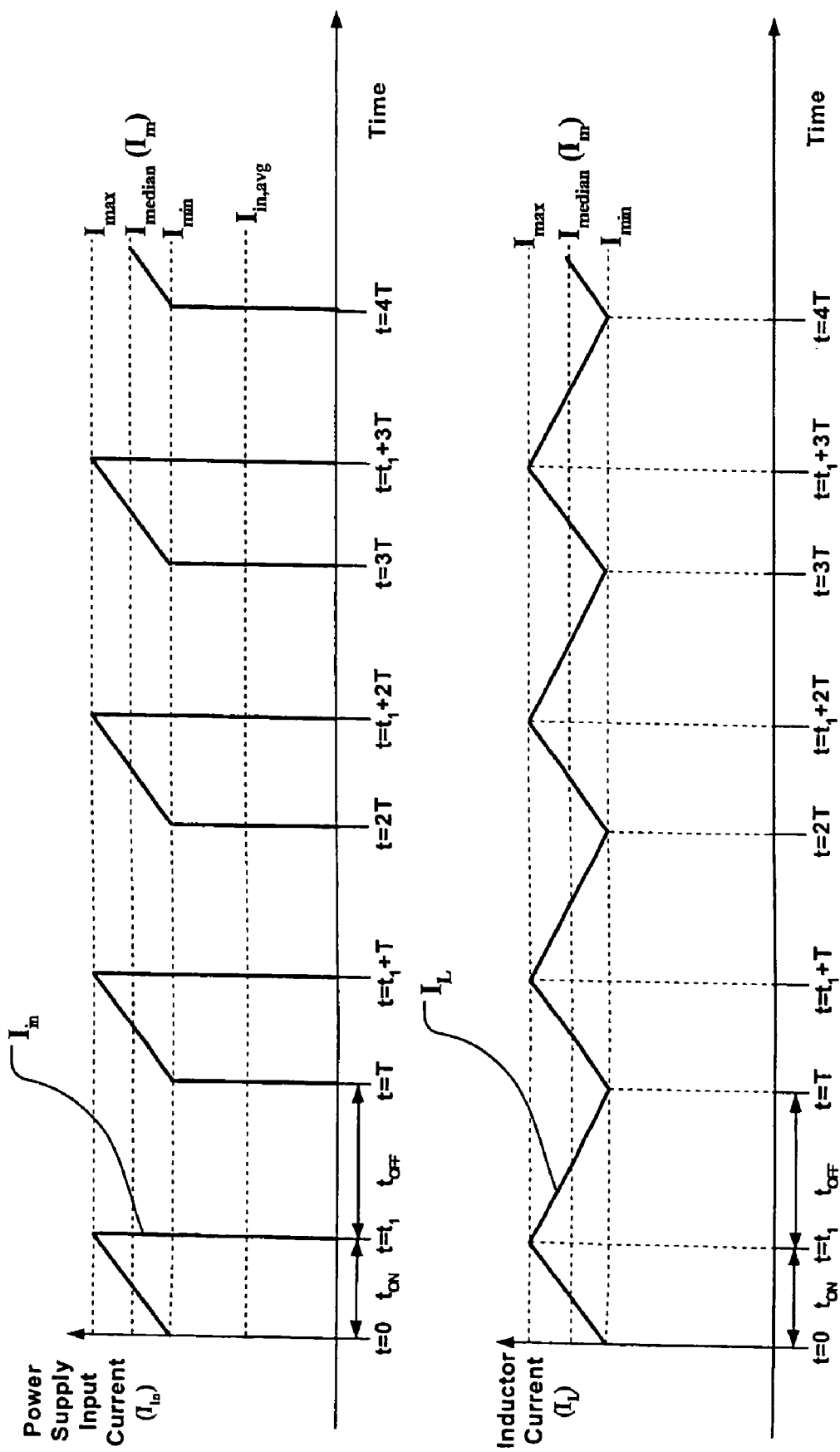
FIG. 10A is a schematic illustration of a number of the current waveforms associated with a first operational mode of the FIG. 10 power supply.

In a first operational mode of power supply 412, switches S2, S3 are maintained OFF (i.e. open) throughout the operation. Steady state waveforms representing the inductor current $I_L$ and the input current $I_{in}$ for this operational mode are shown in FIG. 10A. While the waveforms of FIG. 10A depict a continuous conduction mode of operation, those skilled in the art will appreciate that power supply 412 may also operated in a discontinuous conduction mode.

For the purpose of explaining the basic operation of power supply 412 in the first operational mode depicted in FIG. 10A, it is assumed that power supply 412 operates with a constant switching period T and a constant duty cycle $D=t_1/T$. Switches S1 and S4 are turned ON for a time $0<t<t_1=DT$ ($t_{ON}$). During this time ($t_{ON}$) when switches S1 and S4 are ON, current flows from power source 414, through switch S1, inductor 424 and switch S4, to ground. Consequently, the inductor current $I_L$ and the input current $I_{in}$ rise and charge is built up in inductor 424. The switching period T, the components of power supply 412, load 416 and power source 414 are preferably selected such that power supply 412 has response times that are large in comparison to the switching period T. As a result, the voltages $V_{in}$ and $V_{out}$ are approximately constant in the steady state and the increase in the inductor current $I_L$ and the input current $I_{in}$ may be treated as approximately linear. During the period of time $0<t<t_1=DT$, current is supplied to load 416 by capacitor 417.

At $t=t_1=DT$, switches S1 and S4 are turned OFF for the balance of the switching period T (i.e. for $t_1=DT<t<T$). When switches S1, S4 are turned OFF at $t=t_1$, the input current $I_{in}$ is reduced to zero, diode D1 is reverse biased and the flow of inductor current $I_L$ is maintained through the current path comprising diode D2, inductor 424, diode D3 and load 416. For $t_1=DT<t<T$, the inductor current $I_L$ decreases until inductor 424 is completely discharged (discontinuous conduction mode) or until switches S1 and S4 are turned ON again at t=T in a subsequent switching period (continuous conduction mode).

In alternative embodiments of this operational mode, switches S2, S3 need not be maintained in an OFF state and are switched in a manner that is complementary (i.e. opposite) to switches S1, S4. In such embodiments, when switches S1, S4 are turned OFF for $t_1=DT<t<T$, switches S2, S3 are turned ON to provide a direct current path which bypasses their respective diodes D2, D3, avoiding their associated forward bias voltage drops.

Figure 10B:
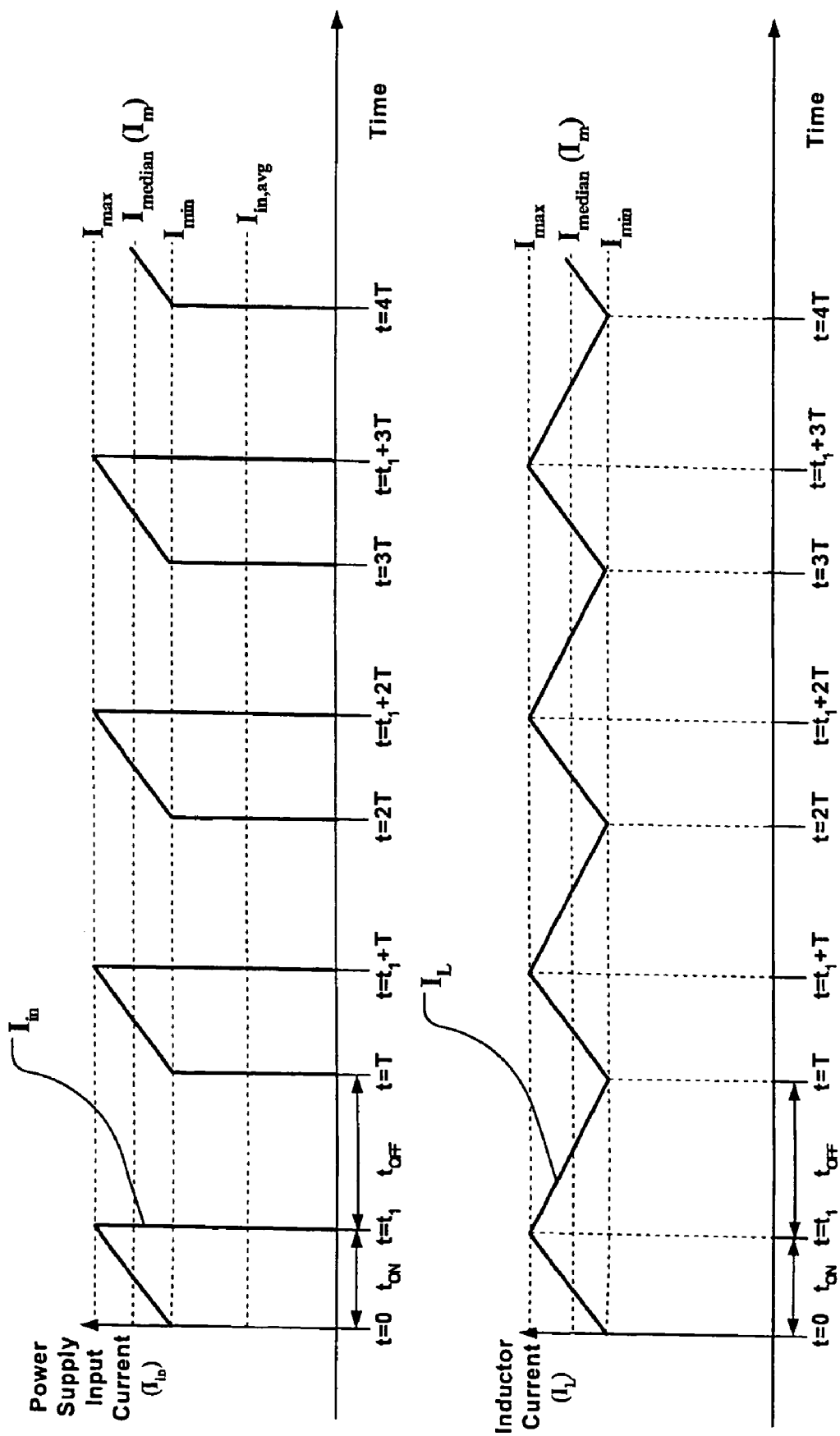
FIG. 10B is a schematic illustration of a number of the current waveforms associated with a second operational mode of the FIG. 10 power supply.

In a second operational mode of power supply 412, switches S2 and S4 are maintained OFF and switch S3 is maintained ON throughout the operation. This second operational mode may be used in circumstances where $V_{in} \geq V_{out}$. Steady state waveforms representing the inductor current $I_L$ and the input current $I_{in}$ for this operational mode are shown in FIG. 10B. While the waveforms of FIG. 10B depict a continuous conduction mode of operation, those skilled in the art will appreciate that power supply 412 may also operate in a discontinuous conduction mode.

For the purpose of explaining the basic operation of power supply 412 in the second operational mode depicted in FIG. 10B, it is assumed that power supply 412 operates with a constant switching period T and a constant duty cycle $D=t_1/T$. Switch S1 is turned ON for a time $0<t<t_1=DT$ ($t_{ON}$).

During this time ($t_{ON}$) when switch S1 is ON, current flows from power source 414, through the current path comprising switch S1, inductor 424, switch S3 and load 416. Consequently, the inductor current $I_L$ and the input current $I_{in}$ rise and charge is built up in inductor 424. Preferably, the switching period T, the components of power supply 412, load 416 and power source 414 are selected such that the response times of power supply 412 are large in comparison to the switching period T. As a result, the voltages $V_{in}$ and $V_{out}$ are relatively constant in the steady state and the increase in the inductor current $I_L$ and the input current $I_{in}$ may be treated as approximately linear.

At $t=t_1=DT$, switch S1 is turned OFF for the balance of the switching period T (i.e. for $t_1=DT<t<T$). When switch S1 is turned OFF at $t=t_1$, the input current $I_{in}$ is reduced to zero, diode D1 is reverse biased and the flow of inductor current $I_L$ is maintained through the current path comprising diode D2, inductor 424, switch S3 and load 416. For $t_1=DT<t<T$, the inductor current $I_L$ decreases until inductor 424 is completely discharged (discontinuous conduction mode) or until switch S1 is turned ON again at t=T in a subsequent switching cycle (continuous conduction mode).

In alternative embodiments of this operational mode, switch S2 need not be maintained in an OFF state and is switched in a manner that is complementary (i.e. opposite) to switch S1. In such embodiments, when switch S1 is turned OFF for $t_1=DT<t<T$, switch S2 is turned ON to provide a direct current path which bypasses diode D2, avoiding its associated forward bias voltage drop.

It can be seen from the waveforms of FIGS. 2, 10A and 10B, that the input current $I_{in}$ and the diode current $I_L$ of power supply 412 behave in a manner that is similar to the behavior of the input current $I_{in}$ and the diode current $I_L$ of power supply 12 (FIG. 4). Accordingly, current control system 432, which comprises current sensor 430, A/D converter 428, processor 426 and switch drivers 420, may operate using control techniques substantially similar to those described above to control the average input current $I_{in,avg}$, causing it to track a desired average input current $I_{in,avg,des}$. In accordance with such control techniques, during a given switching period T, the input current $I_{in}$ may be sampled at a time $t=t_1/2$, where $t_1$ represents the time that the relevant switch(es) transition from an ON state to an OFF state. The average input current $I_{in,avg}$ may then be determined in accordance with equation (6) by multiplying the sampled input current $I_{in}$ with the current duty cycle $D=t_1/T$. Any conventional control technique may be used by processor 426 to determine a new duty cycle D (or equivalently a new $t_1$) to be applied to the relevant switch(es) during a subsequent switching period. Continually updating the duty cycle D in this manner ensures that the average input current $I_{in,avg}$ tracks the desired average input current $I_{in,avg,des}$.

Figure 10C:
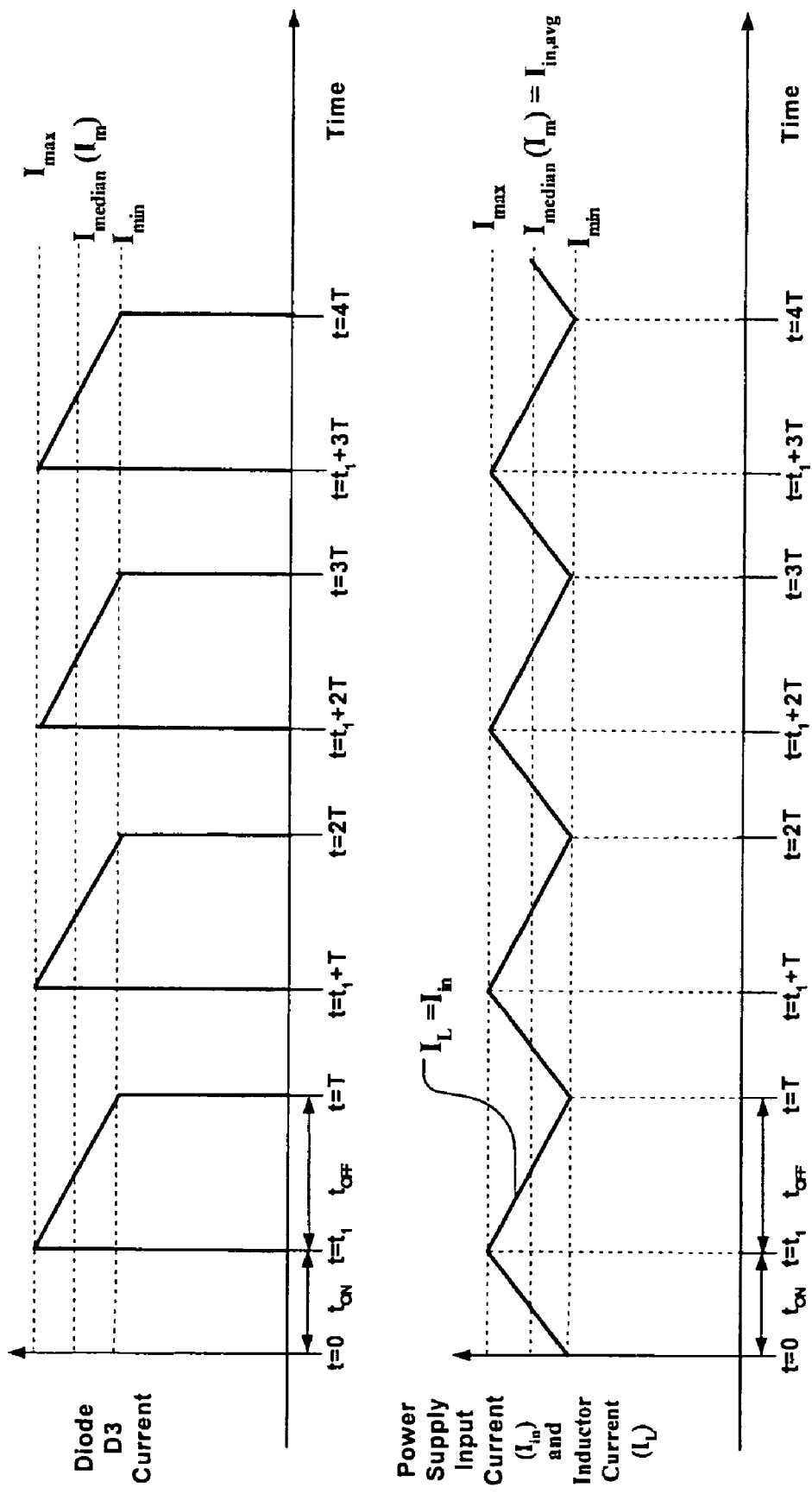
FIG. 10C is a schematic illustration of a number of the current waveforms associated with a third operational mode of the FIG. 10 power supply.

In a third operational mode of power supply 412, switch S1 is maintained ON throughout the operation and switches S2 and S3 are maintained OFF throughout the operation. This third operational mode may be used in circumstances where $V_{out} \geq V_{in}$. Steady state waveforms representing the inductor current $I_L$, the input current $I_{in}$ and the current through diode D3 for this operational mode are shown in FIG. 10C. As shown in FIG. 10C, the inductor current $I_L$ for this third operational mode is approximately equal to the input current $I_{in}$. The waveforms of FIG. 10C depict a continuous conduction mode of operation.

For the purpose of explaining the basic operation of power supply 412 in the third operational mode shown in FIG. 10C, it is assumed that power supply 412 operates in a continuous conduction mode with a constant switching period T and a constant duty cycle $D=t_1/T$. Switch S4 is turned ON for a time $0<t<t_1=DT$ ($t_{ON}$). During this time ($t_{ON}$) when switch S4 is ON, current flows from power source 414, through switch S1, inductor 424 and switch S4 to ground. Consequently, the inductor current $I_L$ and the input current $I_{in}$ rise and charge is built up in inductor 424. Preferably, the switching period T, components of power supply 412, load 416, and power source 414 are selected such that the response times of power supply 412 are large in comparison to the switching period T. As a result, the voltages $V_{in}$ and $V_{out}$ are relatively constant in the steady state and the increase in the inductor current $I_L$ and the input current $I_{in}$ may be treated as approximately linear. During the period of time $0<t<t_1=DT$ (i.e. when switch S4 is ON), diode D3 does not conduct and current is supplied to load 416 by capacitor 417.

At $t=t_1=DT$, switch S4 is turned OFF for the balance of the switching period T (i.e. for $t_1=DT<t<T$). When switch S4 is turned OFF at $t=t_1$, the flow of inductor current $I_L$ is maintained through diode D3. Diode D3 is forward biased and current flows from power source 414, through switch S1, inductor 424, diode D3 and load 416. The current flow through diode D3 also charges capacitor 417 when switch S4 is OFF. For $t_1=DT<t<T$, the inductor current $I_L$ decreases until switch S4 is turned ON again at $t=T$ in a subsequent switching period. In alternative embodiments of this operational mode, switch S3 need not be maintained in an OFF state and is switched in a manner that is complementary (i.e. opposite) to switch S4. In such embodiments, when switch S4 is turned OFF for $t_1=DT<t<T$, switch S3 is turned ON to provide a direct current path which bypasses diode S3, avoiding its associated forward bias voltage drop.

It can be seen by analyzing the waveforms of FIG. 10C, that in this third operational mode of power supply 412, the average input current $I_{in,avg}$ is equal to the median current $I_m=(I_{min}+I_{max})/2$. If $t_1$ is designated to represent the time that switch S4 transitions from an ON state to an OFF state, equations (1), (5), (7) and (8) may also be applied to this third operational mode of power supply 412. It can be seen from equation (8) that the median input current $I_m$ (and thus the average input current $I_{in,avg}$) may be determined by sampling the input current at the time $t=t_1/2$. In this particular embodiment, there is no need to multiply the median input current $I_m$ by the duty cycle, as the median input current $I_m$ is equal to the average input current $I_{in,avg}$. Current control system 432, which comprises current sensor 430, A/D converter 428, processor 426 and switch drivers 420, may operate using control techniques substantially similar to those described above to sample the input current $I_{in}$ at appropriate times and to control the average input current $I_{in,avg}$, causing it to track a desired average input current $I_{in,avg,des}$. In accordance with such control techniques, during a given switching period T, the input current $I_{in}$ may be sampled at a time $t=t_1/2$ to determine the median current $I_m$ (and thus the average input current $I_{in,avg}$). Any conventional control technique may be used by processor 426 to determine a new duty cycle D (or equivalently a new $t_1$) to be applied to switch S4 during a subsequent switching period. Continually updating the duty cycle D of switch S4 in this manner ensures that the average input current $I_{in,avg}$ tracks the desired average input current $I_{in,avg,des}$.

Figure 11:
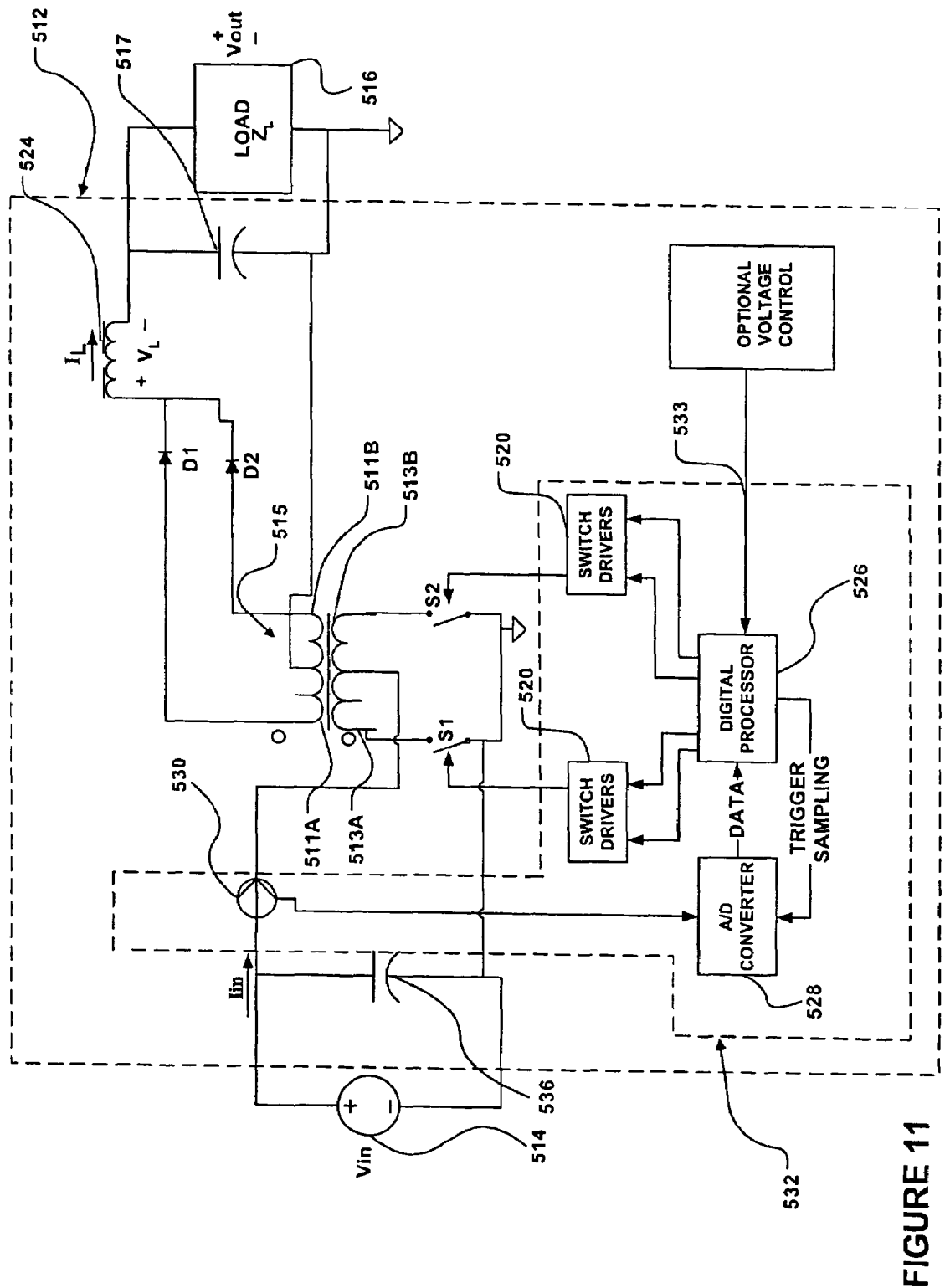
FIG. 11 is a schematic circuit diagram of a switch mode power supply having a push-pull topology together with an associated control system according to a particular embodiment of the invention.

FIG. 11 depicts another alternative embodiment of the invention implemented in a power supply 512 having a configuration referred to as a "push-pull" topology. Power supply 512 couples a DC power source 514 to load 516. In the illustrated embodiment, power supply 512 comprises a pair of switches S1, S2, a transformer 515, a pair of diodes D1, D2, an inductor 524, an optional input filter (represented by capacitor 536), a capacitive output filter 517 and a corresponding control system 532. Transformer 515 comprises a first pair of windings 511A, 513A and a second pair of windings 511B, 513B.

Figure 11A:
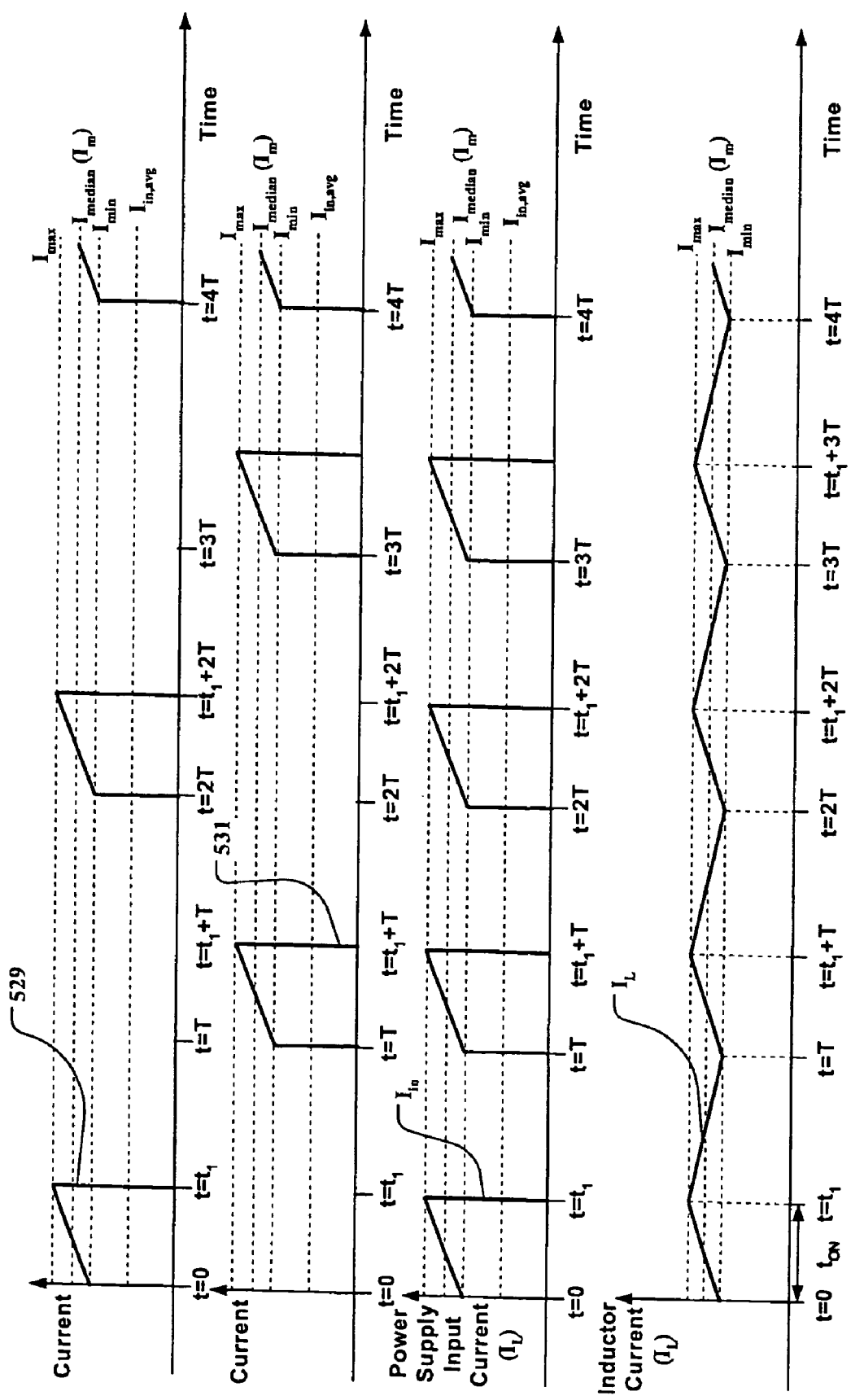
FIG. 11A is a schematic illustration of a number of the current waveforms associated with the FIG. 11 power supply.

In operation, switches S1 and S2 are turned ON and OFF periodically with a period of 2T, which is twice the power supply switching period T experienced by inductor 524 and load 516. FIG. 11A depicts steady state waveforms representing the current 529 through switch S1, the current 531 through switch S2, the inductor current $I_L$ and the input current $I_{in}$ for power supply 512. As shown in FIG. 11A, the input current $I_{in}$ is the sum of the current 529 through switch S1 and the current 531 through switch S2. While the waveforms of FIG. 11A depict a continuous conduction mode of operation, those skilled in the art will appreciate that power supply 512 may also operate in a discontinuous conduction mode.

For the purpose of explaining the basic operation of power supply 512 as illustrated in FIG. 11A, it is assumed that power supply 512 operates with a constant switching period T and a constant duty cycle $D=t_1/T$ and that transformer 515 is an ideal transformer. One of switches S1 and S2 is turned ON every switching period T. For example, in the waveforms shown in FIG. 11A, switch S1 is turned ON first, for a time $0<t<t_1=DT$ ($t_{ON}$). During this time ($t_{ON}$) when switch S1 is ON, current signal 529 flows from power source 514, through primary winding 513A and switch S1, to ground. Current signal 529 creates a voltage in secondary winding 511B, which forward biases diode D2, causes the inductor current $I_L$ in inductor 524 to increase and supplies current to load 516. Consequently, charge is built up in inductor 524. Preferably, the switching period T, the components of power supply 512, load 516 and power source 514 are selected such that the response times of power supply 512 are large in comparison to the switching period T. Consequently, the voltages $V_{in}$ and $V_{out}$ are approximately constant in the steady state and the increase in the inductor current $I_L$ and the corresponding increase in the current 529 through switch S1 may be treated as approximately linear.

At $t=t_1=DT$, switch S1 is turned OFF for the balance of the switching period T (i.e. for $t_1=DT<t<T$). When switch S1 is turned OFF at $t=t_1$, the input current $I_{in}$ is reduced to zero and the flow of inductor current $I_L$ is maintained through diodes D1 and D2. For $t_1=DT<t<T$, the inductor current $I_L$ decreases until inductor 524 is completely discharged (discontinuous conduction mode) or until switch S2 is turned ON at $t=T$ (continuous conduction mode).

At $t=T$, switch S2 is turned ON for a time $T<t<T+t_1=(D+1)T$. During this time when switch S2 is ON, current signal 531 flows from power source 514, through primary winding 513A and switch S2, to ground. Current signal 531 creates a voltage in secondary winding 511B, which forward biases diode D1, causes the inductor current $I_L$ in inductor 524 to increase and supplies current to load 516.

At $t=T+t_1=(D+1)T$, switch S2 is turned OFF for the balance of the switching period (i.e. for $T+t_1=(D+1)T<t<2T$). When switch S2 is turned OFF at $t=T+t_1$, the input current $I_{in}$ is reduced to zero and the flow of inductor current $I_L$ is maintained through diodes D1 and D2. For $T+t_1=(D+1)T<t<2T$, the inductor current $I_L$ decreases until inductor 524 is completely discharged (discontinuous conduction mode) or until switch S1 is turned ON at $t=2T$ in a subsequent switching period (continuous conduction mode).

Current control system 532 comprises current sensor 530, A/D converter 528, processor 526 and switch drivers 520. Current control system 532 may operate using techniques similar to those described above to control the average input current $I_{in,avg}$, so that it tracks a desired average input current $I_{in,avg,des}$. In accordance with such control techniques, the input current $I_{in}$ may be sampled once during a given switching period T. For a given switching period T, input current sampling may occur at a time $t=t_1/2$ where $t_1$ represents the time that the relevant one of switches (S1 or S2) transitions from its ON state to its OFF state. The average input current $I_{in,avg}$ may then be obtained in accordance with equation (6) by multiplying the sampled input current with the current duty cycle $D=t_1/T$. Any conventional control technique may be used by processor 526 to determine a new duty cycle D (or equivalently a new $t_1$) to be applied to the relevant one of switches S1 or S2 during a subsequent switching cycle. Continually updating the duty cycle D in this manner ensures that the actual average input current $I_{in,avg}$ tracks the desired average input current $I_{in,avg,des}$.

Because control system 532 alternates between activating switch S1 and activating switch S2, the actual switching frequencies of these switches S1, S2 is half the switching frequency of power supply 512 (i.e. of input current $I_{in}$ and the inductor current $I_L$) When switch S1 is turned ON and a sample of the input current $I_{in}$ is obtained, the next update of duty cycle D may be applied to the operation of switch S2. Similarly, when switch S2 is turned ON and a sample of the input current $I_{in}$ is obtained, the next update of duty cycle D may be applied to the operation of switch S1. In this manner, processor 526 updates the duty cycle for each switch S1, S2 once every 2T, but effectively updates duty cycle D of power supply 512 once every switching period T. In alternative embodiments, the duty cycle D is updated once for every plurality of switching periods T of power supply 512.

Certain implementations of the invention comprise computer processors which execute software instructions which cause the processors to perform a method of the invention. The invention may also be provided in the form of a program product. The program product may comprise any medium which carries a set of computer-readable signals comprising instructions which, when executed by a data processor, cause the data processor to execute a method of the invention. The program product may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like or transmission-type media such as digital or analog communication links. The program product may also comprise data, databases or other information which may be accessible to, but not necessarily executed by, a processor.

Where a component (e.g. a software module, processor, assembly, device, circuit, etc.) is referred to above, unless otherwise indicated, reference to that component (including a reference to a "means") should be interpreted as including, as equivalents of that component, any component which performs the function of the described component (i.e. that is functionally equivalent), including components which are not structurally equivalent to the disclosed structure which performs the function in the illustrated exemplary embodiments of the invention.

As will be apparent to those skilled in the art in the light of the foregoing disclosure, many alterations and modifications are possible in the practice of this invention without departing from the spirit or scope thereof. For example:

The switch mode power supplies depicted and discussed above represent particular embodiments of switch mode power supplies having various topologies. Those skilled in the art will recognize that the particular circuits illustrated and discussed above are merely representative of various power supply topologies and that many alterations and modifications may be made to the particular circuit components and to the particular circuit connections of these power supplies. Such alterations and/or modifications to the power supply circuits do not materially affect the inventive current control methods and apparatus disclosed herein and should be considered to be within the scope of the invention. Furthermore, the current control invention described herein may be applied to other switch mode power supply topologies different than the ones described herein.

A voltage control system substantially similar to voltage control system 70 of FIG. 4A may optionally be added to any of the other power supply topologies depicted and described above. Such a voltage control system can function in substantially the same manner as the voltage control system 70 of FIG. 4A to sample the output voltage $V_{out}$ and determine a desired average input current $I_{in,avg,des}$ that will cause the output voltage $V_{out}$ to track a desired output voltage $V_{out,des}$. This desired average input current $I_{in,avg,des}$ can then be used as a reference by the respective current control systems as discussed above. Preferably, the voltage control system operates relatively slowly in comparison to the current control system with which it is used.

For ease of explanation, the input current sampling time for the various control systems and power supplies depicted and described above is explained as being $t=t_1/2$ where $t_1$ represents the time that the relevant switch(es) transition from an ON state to an OFF state. Any of the power supply topologies, current control systems and current control methods of this invention may also incorporate a sampling delay $\Delta$ to account for the non-zero switching times of their respective switches. In such embodiments, the input current sampling may occur at $t=t_1/2+\Delta$. The incorporation of a sampling delay is described above in relation to control system 32 of FIG. 4. Similarly, any of the power supply topologies, current control systems and current control methods of this invention may also sample at sampling times symmetric about $t_1/2$ (i.e. at $t=t_1/2\pm\delta$) or about $t_1/2+\Delta$ (i.e. at $t=t_1/2+\Delta\pm\delta$) and the sampled input current values may be averaged to obtain an estimate of the median current $I_m$ (i.e. the input current $I_{in}$ at $t=t_1/2$). Once again, the incorporation of multiple sampling times symmetric about $t_1/2$ or about $t_1/2+\Delta$ is discussed above in relation to control system 32 of FIG. 4 and method 600 of FIG. 5A.

In all of the embodiments depicted and described above, the current sensor is shown connected on the positive current path. For example, in the buck topology of FIG. 4, current sensor 30 is connected between the positive terminal of power source 14 and power supply 12. In alternative embodiments, the current sensor is connected in the negative current path. For example, in the buck topology of FIG. 4, current sensor 30 may be connected between the negative terminal of power source 14 and power supply 12.

Current control methods 100 and 600 of FIG. 5 and FIG. 5A represent particular embodiments of how the inventive current control methods of the present invention may be implemented. Those skilled in the art will easily recognize that method 100 and method 600 may be modified without departing from the scope of the invention. For example, the order in which the blocks are organized in method 100 or in method 600 may be modified or altered. In one particular exemplary modification, the interrupt generated in block 120 of method 100 (or block 626 of method 600) may occur at any time during method 100 (or method 600) depending on the sampling time(s) used in the particular control method.

In some applications, the duty cycle D (or equivalently, the time $t_1$) may be too small to obtain accurate digital current sample(s) at the appropriate time(s) or switch delays may be comparable to $t_1$. For example, in the buck converter 12 of FIG. 4, the duty cycle D may be so small that there is not enough time for A/D converter 28 to digitize a current sample. In such circumstances, processor 26 may be provided with a minimum value for $t_1$ ($t_{min}$). If the control calculations performed by processor 26 indicate that $t_1$ should be set to a value less than $t_{1min}$, then processor 26 may increase the switching period T of power supply 12 to achieve the desired duty cycle D. For example, if the control calculations determine a duty cycle D=0.04, but a 4% duty cycle involves a $t_1$ value less than $t_{1min}$, then processor 26 may set $t_1=t_{1min}$ and increase switching period T to achieve a duty cycle of D=0.04. These changes to switching period may be performed as a part of the control calculations in block 154 (of FIG. 5) or in block 656 (of FIG. 5A), for example. Alternatively, in such circumstances, the switching period T of power supply 12 may be altered while maintaining the duty cycle D constant, in order to increase the effective ON time ($t_1$) of switch 18. For example, if the duty cycle D falls below a threshold level $D_{thresh}$, the power supply switching period T and the effective ON time ($t_1$) may be increased by a factor α. Preferably, but not necessarily, $0<\alpha\leq5$ and $0<D_{thresh}<0.06$. For example, if $D_{thresh}=0.02$ and α=2 and the duty cycle D falls below 0.02, then the switching period T may be doubled and the effective on time $t_1$ may be doubled. These changes to switching period T and the effective ON time $t_1$ may be performed as a part of the control calculations in block 154 (of FIG. 5) or in block 656 (of FIG. 5A), for example. These techniques will provide A/D converter 28 with enough time to obtain a current sample at the appropriate time(s). While these low duty cycle techniques have been described in reference to the buck topology power supply 12 of FIG. 4, those skilled in the art will appreciate that these low duty cycle techniques may be applied to any of the power supply topologies, current control systems and current control methods described above.

Accordingly, the scope of the invention is to be construed in accordance with the substance defined by the following claims.

What is claimed is:

1. A method for controlling a switch mode power supply which couples a power source to a load, the method comprising:

operating at least one switch with a switching period T, wherein, during a given switching period, operating the at least one switch comprises operating the at least one switch with a first duty cycle $D=t_1/T$ by turning ON the at least one switch at a time $t=0$ and turning OFF the at least one switch at a time $t=t_1$;

sampling a power supply input current at one or more sample times during the given switching period to obtain one or more sampled input current values, the one or more sample times synchronized with respect to the time $t=t_1$;

determining an estimate of a median input current $I_m$ based at least in part on the one or more sampled input current values;

determining an estimate of an average input current $I_{in,avg}$ by multiplying the estimate of the median input current $I_m$ and the first duty cycle D;

determining a new duty cycle D based at least in part on the estimate of the average input current $I_{in,avg}$; and operating the at least one switch with the new duty cycle D during a subsequent switching period;

wherein operating the at least one switch with the new duty cycle D causes the average input current $I_{in,avg}$ to track a desired average input current $I_{in,avg,des}$.

2. A method according to claim 1 wherein sampling the power supply input current at one or more sample times during the given switching period comprises sampling the power supply input current once at a time substantially close to $t=t_1/2$ to obtain a corresponding sampled input current value.

3. A method according to claim 2 wherein determining the estimate of the median input current $I_m$ comprises setting the estimate of the median input current $I_m$ to be equal to the corresponding sampled input current value.

4. A method according to claim 1 wherein sampling the power supply input current at one or more sample times during the given switching period comprises sampling the power supply input current once at a time substantially close to $t=t_1/2+\Delta$, where Δ is a delay time, to obtain a corresponding sampled input current value.

5. A method according to claim 4 wherein Δ comprises an estimate of a delay associated, at least in part, with the at least one switch.

6. A method according to claim 4 wherein determining the estimate of the median input current $I_m$ comprises setting the estimate of the median input current $I_m$ to be equal to the corresponding sampled input current value.

7. A method according to claim 1 wherein sampling the power supply input current at one or more sample times during the given switching period comprises sampling the power supply input current twice at times substantially close to $t=t_1/2\pm\delta$, where δ is a time less than $t_1/2$, to obtain a pair of corresponding sampled input current values.

8. A method according to claim 7 wherein determining the estimate of the median input current $I_m$ comprises averaging the pair of corresponding sampled input current values.

9. A method according to claim 1 wherein sampling the power supply input current at one or more sample times during the given switching period comprises sampling the power supply input current twice at times substantially close to $t=t_1/2+\Delta\pm\delta$, where Δ is a delay time and δ is a time less than $t_1/2$, to obtain a pair of corresponding sampled input current values.

10. A method according to claim 9 wherein Δ comprises an estimate of a delay associated, at least in part, with the at least one switch.

11. A method according to claim 9 wherein determining the estimate of the median input current $I_m$ comprises averaging the pair of corresponding sampled input current values.

12. A method according to claim 1 wherein sampling the power supply input current at one or more sampling times during the given switching period comprises sampling the power supply input current at a plurality of sample times symmetric about $t=t_1/2+\Delta$, where $\Delta$ is a delay time, to obtain a corresponding plurality of sampled input current values.

13. A method according to claim 12 wherein $\Delta$ comprises an estimate of a delay associated, at least in part, with the at least one switch.

14. A method according to claim 12 wherein determining the estimate of the median input current $I_m$ comprises averaging the corresponding plurality of sampled input current values.

15. A method according to claim 1 wherein the subsequent switching period follows immediately after the given switching period.

16. A method according to claim 1 wherein the subsequent switching period is temporally spaced apart from the given switching period by at least one intervening switching period.

17. A method according to claim 1 wherein determining the new duty cycle D for the at least one switch is based at least in part on the desired average input current $I_{in,avg,des}$ and on historical and current estimates of the average input current $I_{in,avg}$.

18. A method according to claim 17 comprising determining the desired average input current $I_{in,avg,des}$ using a voltage control loop by:
periodically sampling a voltage at the load $V_{out}$ and, based at least in part on sampled load voltages, determining a desired average input current $I_{in,avg,des}$ that will make the voltage at the load $V_{out}$ track a desired output voltage $V_{out,des}$.

19. A method according to claim 6 wherein the subsequent switching period follows immediately after the given switching period.

20. A method according to claim 6 wherein the subsequent switching period is temporally spaced apart from the given switching period by at least one intervening switching period.

21. A method according to claim 6 wherein determining the new duty cycle D for the at least one switch is based at least in part on the desired average input current $I_{in,avg,des}$ and on historical and current estimates of the average input current $I_{in,avg}$.

22. A method according to claim 21 comprising determining the desired average input current $I_{in,avg,des}$ using a voltage control loop by:
periodically sampling a voltage at the load $V_{out}$ and, based at least in part on sampled load voltages, determining a desired average input current $I_{in,avg,des}$ that will make the voltage at the load $V_{out}$ track a desired output voltage $V_{out,des}$.

23. A method according to claim 11 wherein the subsequent switching period follows immediately after the given switching period.

24. A method according to claim 11 wherein the subsequent switching period is temporally spaced apart from the given switching period by at least one intervening switching period.

25. A method according to claim 11 wherein determining the new duty cycle D for the at least one switch is based at least in part on the desired average input current $I_{in,avg,des}$ and on historical and current estimates of the average input current $I_{in,avg}$.

26. A method according to claim 25 comprising determining the desired average input current $I_{in,avg,des}$ using a voltage control loop by:
periodically sampling a voltage at the load $V_{out}$ and, based at least in part on sampled load voltages, determining a desired average input current $I_{in,avg,des}$ that will make the voltage at the load $V_{out}$ track a desired output voltage $V_{out,des}$.

27. A method according to claim 1 wherein determining the new duty cycle D for the at least one switch comprises implementing at least one of: proportional control, proportional derivative control, proportional integral control, proportional integral derivative control and a state space control technique.

28. A method according to claim 1 wherein the switch mode power supply comprises one of: a buck topology, a flyback topology, a bridge topology, a buck-boost topology and a push-pull topology.

29. A method according to claim 1 wherein, when the new duty cycle D is below a predetermined threshold, operating the at least one switch with the new duty cycle D during the subsequent switching period comprises extending a duration of the switching period T for the subsequent switching period.

30. A method for controlling an average input current $I_{in,avg}$ of a switch mode power supply to track a desired average input current $I_{in,avg,des}$, the switch mode power supply comprising one or more switches that operate with a switching period T, the method comprising,
for a given switching period:
turning ON the one or more switches for a first ON period $t_{ON}$ and turning OFF the one or more switches for a first OFF period $t_{OFF}$, where $t_{ON}+t_{OFF}=T$;
sampling a power supply input current at one or more sampling times during the given switching period to obtain one or more sampled input current values, the one or more sampling times synchronized relative to a time $t=t_1$ of a transition between the first ON period $t_{ON}$ and the first OFF period $t_{OFF}$;
determining an estimate of the average input current $I_{in,avg}$ for the given switching period based at least in part on the one or more sampled input current values;
determining a new ON period based at least in part on the estimate of the average input current $I_{in,avg}$; and
operating the one or more switches with the new ON period during a subsequent switching period.

31. A method according to claim 30 wherein determining an estimate of the average input current $I_{in,avg}$ comprises multiplying a first duty cycle $D=t_{ON}/T$ with a median input current value $I_m$ and wherein the median input current value $I_m$ is based at least in part on the one or more sampled input current values.

32. A method according to claim 31 comprising averaging a plurality of the one or more sampled input current values to determine the median input current value $I_m$.

33. A method according to claim 31 comprising setting one of the one or more sampled input current values equal to the median input current value $I_m$.

34. A method according to claim 30 wherein sampling the power supply input current at one or more sampling times during the given switching period comprises sampling the power supply input current once at a time substantially close to $t=t_1-t_{ON}/2$.

35. A method according to claim 30 wherein sampling the power supply input current at one or more sampling times during the given switching period comprises sampling the power supply input current once at a time substantially close to $t=t_1-t_{ON}/2+\Delta$ wherein $\Delta$ comprises an estimate of a delay associated, at least in part, with the one or more switches.

36. A method according to claim 30 wherein sampling the power supply input current at one or more sampling times during the given switching period comprises sampling the power supply input current twice at times substantially close to $t=t_1-t_{ON}/2\pm\delta$, where $\delta$ is a time less than $t_{ON}/2$.

37. A method according to claim 30 wherein sampling the power supply input current at one or more sampling times during the given switching period comprises sampling the power supply input current twice at times substantially close to $t=t_1-t_{ON}/2\pm\delta+\Delta$, where $\delta$ is a time less than $t_{ON}/2$ and $\Delta$ comprises an estimate of a delay associated, at least in part, with the one or more switches.

38. A method for controlling an average input current of a switch mode power supply to track a desired average input current, the switch mode power supply comprising one or more switches that operate with a constant switching period and a variable duty cycle, the method comprising, for each switching period:
    turning ON the one or more switches for an ON period corresponding to a current value of the variable duty cycle; and
    sampling a power supply input current at a sample time synchronous with an end of the ON period to obtain a sampled input current value;
    multiplying the sampled input current value with the current value of the variable duty cycle to obtain an estimate of the average input current;
    determining a new value of the variable duty cycle based at least in part on the estimate of the average input current; and
    operating the one or more switches with the new value of the variable duty cycle during a subsequent switching period.

39. A method for controlling an average input current of a switch mode power supply to track a desired average input current, the switch mode power supply comprising one or more first switches that operate with a first constant switching period and one or more second switches that operate with a second constant switching period, the method comprising:
    at a start of a given switching period, turning ON the one or more first switches for an ON period determined by a current value of a duty cycle;
    sampling a power supply input current at one or more sampling times during the ON period to obtain one or more sampled input current values, the one or more sampling times synchronized relative to an end of the ON period;
    determining an estimate of the average input current based at least in part on the one or more sampled input current values;
    determining a new value of the duty cycle based at least in part on the estimate of the average input current; and
    operating one of: the one or more first switches and the one or more second switches with the new value of the duty cycle during a subsequent switching period.

40. A method according to claim 39 wherein determining an estimate of the average input current comprises multiplying the given duty cycle with a median input current value $I_m$ and wherein the median input current value $I_m$ is based at least in part on the one or more sampled input current values.

41. A method according to claim 40 comprising averaging a plurality of the one or more sampled input current values to determine the median input current value $I_m$.

42. A method according to claim 40 comprising setting one of the one or more sampled input current values equal to the median input current value $I_m$.

43. A switch mode power supply which couples a power source to a load, the power supply comprising:
    at least one switch operable with a switching period T;
    current sampling circuitry connected to sample a power supply input current at one or more sample times during the switching period T; and
    a processor connected to control the switch and the current sampling circuitry, the processor configured to:
        for a given switching period, operate the at least one switch with a first duty cycle $D=t_1/T$ by turning ON the at least one switch at a time $t=0$ and turning OFF the switch at a time $t=t_1$;
        cause the current sampling circuitry to obtain one or more sampled input current values at one or more corresponding sample times synchronized with respect to the time $t=t_1$;
        determine an estimate of a median input current $I_m$ based at least in part on the one or more sampled input current values;
        determine an estimate of an average input current $I_{in,avg}$ by multiplying the estimate of the median input current $I_m$ and the first duty cycle D;
        determine a new duty cycle D for the at least one switch based at least in part on the estimate of the average input current $I_{in,avg}$; and
        operate the at least one switch with the new duty cycle D during a subsequent switching period;
    wherein operating the at least one switch with the new duty cycle D causes the average input current $I_{in,avg}$ to track a desired average input current $I_{in,avg,des}$.

44. A method for controlling an average input current of a switch mode power supply to track a desired average input current, the switch mode power supply comprising one or more switches that operate with a switching period and a variable duty cycle, the method comprising:
    a step for turning ON the one or more switches for an ON period during each switching period, a duration of the ON period determined by a current value of the variable duty cycle;
    a step for sampling a power supply input current at one or more sampling times to obtain one or more sampled input current values, the one or more sampling times synchronized relative to an end of the ON period;
    a step for determining an estimate of the average input current based at least in part on the one or more sampled input current values;
    a step for determining a new value of the variable duty cycle based at least in part on the estimate of the average input current; and
    a step for operating the one or more switches with the new value of the variable duty cycle during a subsequent switching cycle.

45. A method according to claim 44 wherein the step for determining an estimate of the average input current comprises multiplying the current value of the variable duty cycle with a median input current value $I_m$ and wherein the median input current value $I_m$ is based at least in part on the one or more sampled input current values.

46. A method according to claim 45 comprising averaging a plurality of the one or more sampled input current values to determine the median input current value $I_m$.

47. A method according to claim 44 comprising setting one of the one or more sampled input current values equal to the median input current value $I_m$.

* * * * *